United States Patent [19]

Watanabe et al.

[11] Patent Number: 5,844,057

[45] Date of Patent: Dec. 1, 1998

[54] POLYMERS AND CHEMICALLY AMPLIFIED POSITIVE RESIST COMPOSITIONS

[75] Inventors: Osamu Watanabe; Yoshihumi Takeda; Junji Tsuchiya; Toshinobu Ishihara, all of Nakakubiki-gun, Japan

[73] Assignee: Shin-Etsu Chemical Co., Ltd., Japan

[21] Appl. No.: 630,633

[22] Filed: Apr. 11, 1996

[30] Foreign Application Priority Data

Apr. 12, 1995 [JP] Japan ................... 7-111189

[51] Int. Cl.$^6$ ................... C08F 12/24
[52] U.S. Cl. ................... 526/313
[58] Field of Search ................... 526/313

[56] References Cited

U.S. PATENT DOCUMENTS

| | | |
|---|---|---|
| 4,491,628 | 1/1985 | Ito et al. . |
| 4,678,737 | 7/1987 | Schneller et al. . |
| 4,869,994 | 9/1989 | Gupta et al. ................... 526/313 |
| 4,963,596 | 10/1990 | Lindert et al. ................... 526/313 |
| 5,084,490 | 1/1992 | McArdle et al. ................... 526/313 |
| 5,252,435 | 10/1993 | Tani et al. . |
| 5,324,804 | 6/1994 | Steinmann ................... 526/313 |

FOREIGN PATENT DOCUMENTS

| | | | |
|---|---|---|---|
| 0002456 | 6/1979 | European Pat. Off. | ................ 526/313 |
| 0002887 | 7/1979 | European Pat. Off. | ................ 526/313 |
| 0006791 | 1/1977 | Japan | ................ 526/313 |

OTHER PUBLICATIONS

Ans. 8 of 24—EP 92–112559 (920722) in–house computer abstract pp. 33 and 34.

Ans. 9 of 24—JP88-323616 (881223) in–house computer abstract pp. 34 and 35.

Ans. 11 of 24 JP 87–74848 (870328) in–house computer abstract pp. 37 and 38.

Ans. 7 of 26 Hatakeyama et al Acs Symp. Ser 397 (Lignin), 205–18 (English) 1989–in–house computer abstract pp. 78 & 79.

*Primary Examiner*—Jeffrey T. Smith
*Assistant Examiner*—N. Sarofim
*Attorney, Agent, or Firm*—Millen, White, Zelano & Branigan, P.C.

[57] ABSTRACT

The invention provides a novel polymer comprising a recurring unit of formula. (1) wherein $R^1$ is hydrogen or methyl, $R^2$ is hydrogen or acid labile group, at least one $R^2$ being hydrogen and at least one $R^2$ being an acid labile group, and n=2 or 3. The polymer's Mw is 3,000–300,000. Blending the polymer as a base resin with an organic solvent and a photoacid generator yields a chemically amplified positive resist composition.

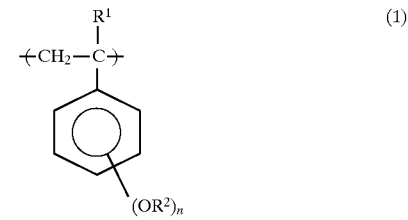

(1)

7 Claims, 1 Drawing Sheet

POLYMERS AND CHEMICALLY AMPLIFIED POSITIVE RESIST COMPOSITIONS

BACKGROUND OF THE INVENTION

1. Field of the Invention

This invention relates to a polymer and a chemically amplified positive resist composition containing the same. More particularly, it relates to a polymer which is blended as a base resin with resist components to form a chemically amplified positive resist composition which has significantly improved alkali dissolution rate contrast before and after exposure, high sensitivity, and high resolution and is thus suitable as a fine pattern-forming material in the manufacture of ultra-LSI's.

2. Prior Art

As the LSI technology tends toward higher integration and higher speed, further refinement of pattern rules is required. Under the circumstances, deep-ultraviolet lithography is regarded promising as fine patterning technology of the next generation. The deep-UV lithography is capable of working on the order of less than 0.5 $\mu$m. If a less light absorbing resist is used, it is possible to form a pattern having a side wall nearly perpendicular to the substrate.

There were recently developed positive working resist materials which undergo acid-catalyzed chemical amplification as disclosed in Japanese Patent Publication (JP-B) No. 27660/1990 (corresponding to U.S. Pat. No. 4,491,628) and Japanese Patent Application Kokai (JP-A) No. 27829/1988 (corresponding to EP 249139). Because of many advantages including sensitivity, resolution, and dry etching resistance, the chemically amplified resist materials are regarded promising for deep-ultraviolet lithography using a high intensity KrF excimer laser as a source of deep-ultraviolet radiation.

Known chemically amplified positive working resist materials include a two-component system comprising a base polymer and a photoacid generator and a three-component system comprising a base polymer, a photoacid generator, and a dissolution regulator having an acid labile group. For example, JP-A 115440/1987 (corresponding to U.S. Pat. No. 4,603,101) discloses a resist composition comprising poly-4-tert-butoxystyrene and a photoacid generator. There are proposed analogous resist compositions. JP-A 223858/1991 (corresponding to U.S. Pat. No. 5,252,435) discloses a two-component resist composition comprising a resin having a tert-butoxy group in a molecule and a photoacid generator. JP-A 211258/1992 discloses a two-component resist composition comprising a polyhydroxystyrene having a methyl, isopropyl, tert-butyl, tetrahydropyranyl or trimethyl-silyl group and a photoacid generator. Further, JP-A 100488/1994 (corresponding to U.S. Pat. No. 5,324,804) discloses a resist composition comprising a polydihydroxystyrene derivative such as poly(3,4-bis(2-tetrahydropyranyloxy)-styrene), poly(3,4-bis(tert-butoxycarbonyloxy)styrene), and poly(3,5-bis(2-tetrahydropyranyloxy)styrene) and a photoacid generator.

These resist compositions, however, are not necessarily satisfactory in that some are low in contrast of a dissolution rate of a resist film, some have unsatisfactory sensitivity and resolution, and some are less process adaptable. None of them have been used in practice. There is a need to overcome these problems.

SUMMARY OF THE INVENTION

An object of the present invention is to provide a polymer which is blended as a base resin with resist components to form a chemically amplified positive resist composition which is improved in sensitivity, resolution, latitude of exposure, and process adaptability over the conventional resist compositions.

Another object of the present invention is to provide a chemically amplified positive resist composition using the polymer as a base resin.

We have found that a novel polymer having a recurring unit of the general formula (1) or a novel polymer of the general formula (2) or (3) to be defined below, all having a weight average molecular weight of 3,000 to 300,000, can be formed by a method to be described later. A chemically amplified positive resist composition is obtained using any of these polymers as a base resin. More particularly, chemically amplified positive resist compositions are obtained by adding a photoacid generator to the polymer, or by adding a photoacid generator and a dissolution regulator to the polymer, or by adding a photoacid generator, a dissolution regulator, and a basic compound to the polymer. These resulting chemically amplified positive resist compositions afford resists which have high sensitivity, high resolution, improved latitude of exposure, and improved process adaptability and are well suited for practical use and advantageously used in precise fine patterning, especially in ultra-LSI manufacture.

The formulae (1) to (3) are shown below.

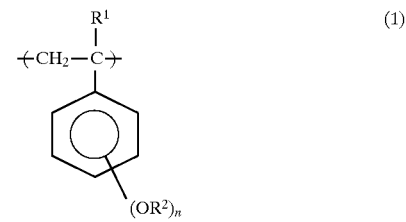

$R^1$ is a hydrogen atom or methyl group,
    $R^2$ is a hydrogen atom or acid labile group, at least one $R^2$ being a hydrogen atom and at least one $R^2$ being an acid labile group, and
letter n is equal to 2 or 3.

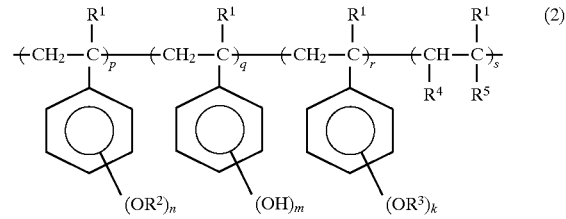

$R^1$ is independently a hydrogen atom or methyl group,
    $R^2$ is a hydrogen atom or acid labile group, at least one $R^2$ being a hydrogen atom and at least one $R^2$ being an acid labile group,
$R^3$ is an acid labile group,
$R^4$ is a hydrogen atom,
$R^5$ is a group represented by

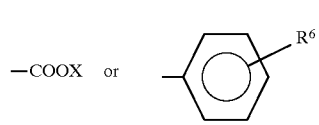

wherein X is a hydrogen atom or acid labile group and $R^6$ is a hydrogen atom or an alkyl group of 1 to 6 carbon atoms, or $R^4$ and $R^5$, taken together, may form —C(O)—O—C(O)—, each of the units may be of one or more types, letter n is equal to 2 or 3, each of m and k is equal to 1, 2 or 3, p and q are positive numbers and r and s are 0 or positive numbers satisfying $0 < (p+q)/(p+q+r+s) \leq 1$ and the sum of p+q+r+s is a sufficient number to give a weight average molecular weight in the above-defined range.

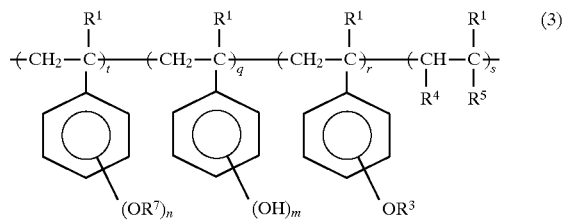

$R^1$, $R^3$, $R^4$, and $R^5$ are as defined above, $R^7$ is an acid labile group, each of the units may be of one or more types, letters n and m are as defined above, t and q are positive numbers and r and s are 0 or positive numbers satisfying $0 < (t+q)/(t+q+r+s) \leq 0.7$ and the sum of t+q+r+s is a sufficient number to give a weight average molecular weight in the above-defined range.

In the polymer having a recurring unit of formula (1), some phenolic hydroxyl groups are protected with acid labile groups. When the polymer is blended in a chemically amplified positive resist composition as an alkali-soluble resin, phenolic hydroxyl groups remaining in its molecule form a strong hydrogen bond between its molecules or between its molecule and a photoacid generator and dissolution regulator. In a patterning process including exposure, heating and developing steps, the rate of dissolution in aqueous base solution is strictly controlled in an unexposed area. In an exposed area, an acid labile group moiety of the base resin or matrix is decomposed to cut off the hydrogen bond whereby the rate of dissolution in aqueous base solution is rapidly accelerated.

It is noted that polymeric polyhydric hydroxystyrene derivatives in which all phenolic hydroxyl groups of polyhydric hydroxystyrene are protected with acid labile groups such as tert-butoxycarbonyl groups (often abbreviated as tert-BOC groups), for example, poly(di-tert-butoxycarbonyloxystyrene) are well known in the art. According to our experiment, these fully protected polyhydroxystyrene derivatives form a weak bond to the substrate because of the absence of phenolic hydroxyl groups. The polyhydric hydroxystyrene polymer whose phenolic hydroxyl groups are all protected with acid labile groups such as tert-BOC groups has the problem that it gives off a large amount of decomposed products (e.g., isobutylene and carbon dioxide) after exposure, leaving scum.

Conventional partially tert-BOC-incorporated polyhydroxystyrenes have a relatively low rate of dissolution in alkali of 3,000 Å/sec. after decomposition whereas partially tert-BOC-incorporated polyhydric hydroxystyrene polymers according to the invention have a rate of dissolution of 10,000 Å/sec. Thus a polymer of the invention and a resist composition containing the same are highly effective.

A chemically amplified positive resist composition using a polymer having a recurring unit of formula (1) affords a resist film which has an increased contrast of a rate of dissolution in aqueous basic solution between exposed and unexposed areas as compared with the conventional resists and consequently has high sensitivity and high resolution. The same applies to compositions using polymers of formulae (2) and (3). In addition to the above-mentioned advantages, the chemically amplified positive resist compositions having the copolymers blended as a base resin permit resist patterns to be controlled in size and configuration in terms of their composition and are well process adaptable.

In one aspect, the present invention is directed to a polymer. In a first form, there is provided a polymer comprising a recurring unit of at least one type of formula (1) and having a weight average molecular weight of 3,000 to 300,000.

In a second form, there is provided a polymer of formula (2) and having a weight average molecular weight of 3,000 to 300,000.

In a third form, there is provided a polymer of formula (3) and having a weight average molecular weight of 3,000 to 300,000.

Preferably the polymers are mono-disperse polymers having a molecular weight dispersity of 1.0 to 1.5.

In another aspect, the present invention is directed to a chemically amplified positive resist composition. In a first form, there is provided a chemically amplified positive resist composition comprising (A) an organic solvent, (B) a base resin in the form of a polymer as defined above, and (C) a photoacid generator which is preferably an onium salt.

In a second form, there is provided a chemically amplified positive resist composition comprising components (A), (B), and (C), and (D) a dissolution regulator in the form of a compound having a weight average molecular weight of 100 to 1,000 and at least two phenolic hydroxyl groups in a molecule, the hydrogen atom of the phenolic hydroxyl group being replaced by an acid labile group in an average amount of 10 to 100% of the entire phenolic hydroxyl groups. The dissolution regulator (D) is preferably at least one compound selected from phenolic hydroxyl group-bearing compounds of formulae (4) to (14) to be described later, the hydrogen atom of the phenolic hydroxyl group of the at least one compound being replaced by an acid labile group.

In a third form, there is provided a chemically amplified positive resist composition comprising components (A), (B), (C), and (E) a dissolution regulator in the form of a compound having a weight average molecular weight of more than 1,000 to 3,000 and a phenolic hydroxyl group in a molecule, the hydrogen atom of the phenolic hydroxyl group being partially replaced by an acid labile group in an average amount of more than 0% to 60% of the entire phenolic hydroxyl groups. The dissolution regulator (E) is preferably at least one compound having a recurring unit of formula (15) to be described later.

A chemically amplified positive resist composition comprising components (A), (B), (C), (D), and (E) is also contemplated.

Each of these chemically amplified positive resist compositions may further have blended therein (F) a basic compound.

BRIEF DESCRIPTION OF THE ACCOMPANYING DRAWINGS

DETAILED DESCRIPTION OF THE INVENTION

Figure 1:
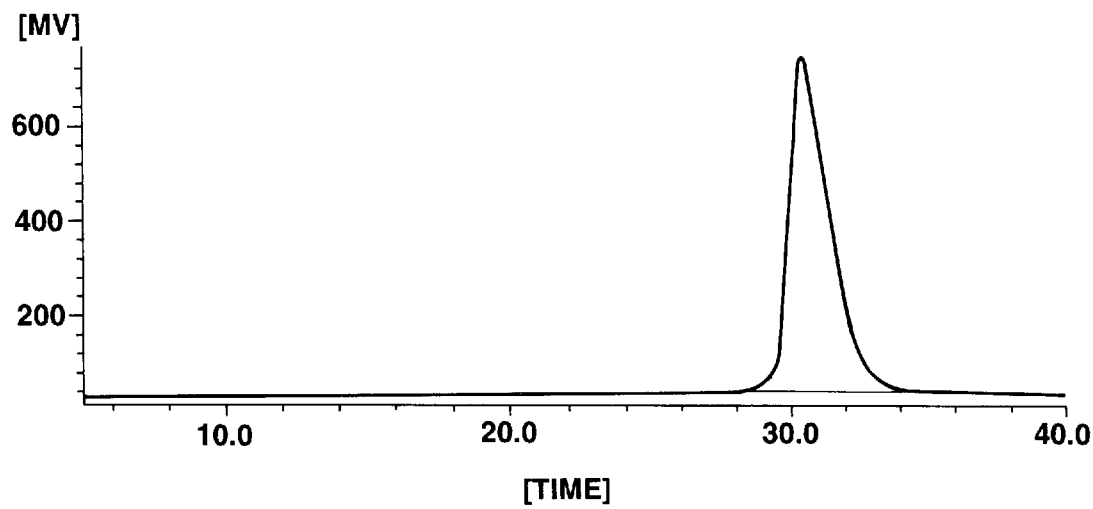
FIG. 1 is a graph showing a GPC elution curve of the polymer obtained in Synthesis Example 14.

In the first aspect, the present invention in the first form provides a polymer comprising a recurring unit of at least one type of the general formula (1):

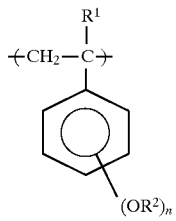

wherein $R^1$ is a hydrogen atom or methyl group, $R^2$ is a hydrogen atom or acid labile group, at least one $R^2$ being a hydrogen atom and at least one $R^2$ being an acid labile group, and letter n is equal to 2 or 3.

The present invention in the second form provides a copolymer of the general formula (2):

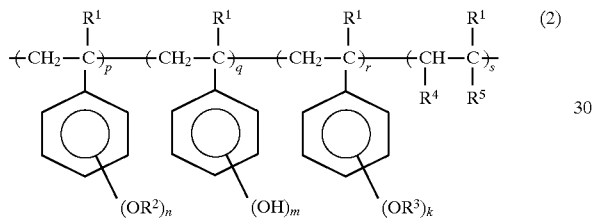

wherein $R^1$ is independently a hydrogen atom or methyl group, $R^2$ is a hydrogen atom or acid labile group, at least one $R^2$ being a hydrogen atom and at least one $R^2$ being an acid labile group, $R^3$ is an acid labile group, $R^4$ is a hydrogen atom, $R^5$ is a group represented by

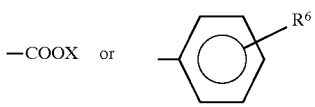

wherein X is a hydrogen atom or acid labile group and $R^6$ is a hydrogen atom or an alkyl group of 1 to 6 carbon atoms (e.g., methyl, ethyl, propyl, and butyl), or $R^4$ and $R^5$, taken together, may form —C(O)—O—C(O)—, each of the units may be of one or more types, letter n is equal to 2 or 3, each of m and k is equal to 1, 2 or 3, p and q are positive numbers and r and s are 0 or positive numbers satisfying $0<(p+q)/(p+q+r+s)\leq 1$ and the sum of p+q+r+s is a sufficient number to give the weight average molecular weight.

The present invention in the third form provides a copolymer of the general formula (3):

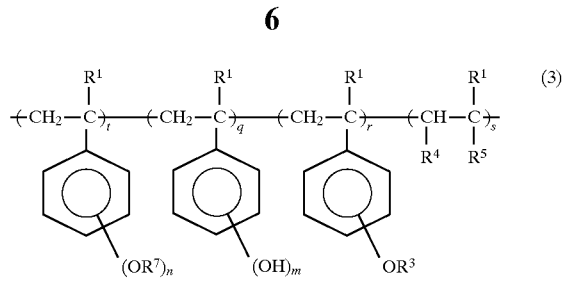

wherein $R^1$, $R^3$, $R^4$, and $R^5$ are as defined above, $R^7$ is an acid labile group, each of the units may be of one or more types, letters n and m are as defined above, t and q are positive numbers and r and s are 0 or positive numbers satisfying $0<(t+q)/(t+q+r+s)\leq 0.7$ and the sum of t+q+r+s is a sufficient number to give the weight average molecular weight.

In formulae (1) to (3), the acid labile group may be selected from various such groups. Preferred acid labile groups are groups of the following formulae (16) and (17), normal, branched or cyclic alkyl groups of 1 to 6 carbon atoms, tetrahydropyranyl, tetrafuranyl and trialkylsilyl groups.

In formulae (16) and (17), $R^{15}$ and $R^{16}$ are independently a hydrogen atom or a normal or branched alkyl group of 1 to 6 carbon atoms, $R^{17}$ is a normal, branched or cyclic alkyl group of 1 to 10 carbon atoms, $R^{18}$ is a hydrogen atom or a normal, branched or cyclic alkyl group of 1 to 6 carbon atoms, and letter a is equal to 0 or 1.

Examples of the normal and branched alkyl groups include methyl, ethyl, propyl, isopropyl, n-butyl, iso-butyl, and tert-butyl groups. Cyclohexyl is a typical cyclic alkyl group. Examples of the acid labile group of formula (16) include methoxyethyl, ethoxyethyl, n-propoxyethyl, iso-propoxyethyl, n-butoxyethyl, iso-butoxyethyl, tert-butoxyethyl, cyclohexyloxyethyl, methoxypropyl, ethoxypropyl, 1-methoxy-1-methylethyl, and 1-ethoxy-1-methylethyl groups. Examples of the acid labile group of formula (17) include tert-butoxycarbonyl and tert-butoxycarbonylmethyl groups. Examples of the trialkylsilyl group include those trialkylsilyl groups whose alkyl moiety has 1 to 6 carbon atoms, such as trimethylsilyl and tri-tert-butyldimethylsilyl groups.

In the polymers having a recurring unit of formula (1), the recurring unit may be of one or more types. That is, the polymer may comprise either recurring units of one type or recurring units of two or more types. The polymer of formula (2) consist essentially of units of formulae (2a), (2b), (2c) and (2d) shown below. The polymer of formula (3) consist essentially of units of formulae (3a), (3b), and (3d) shown below. Each of these units may be of one or more types as long as these types are within the definition of that unit.

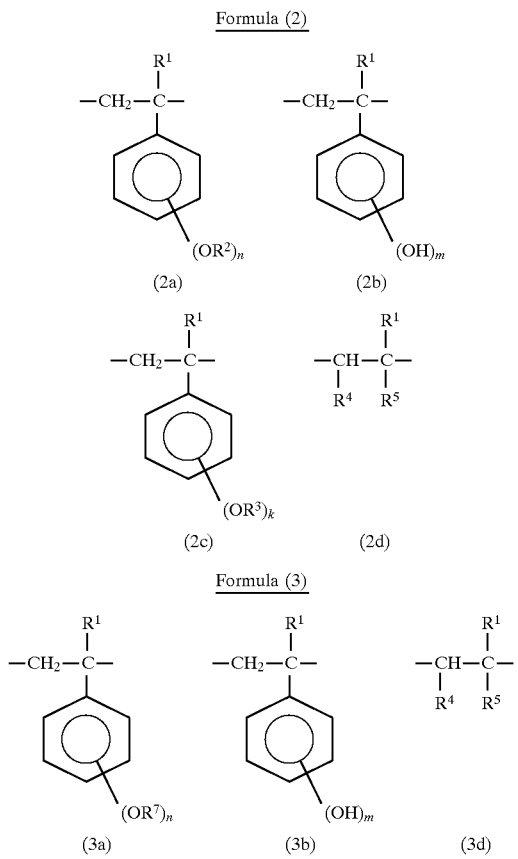

It is preferred that each of the polymers of the invention contain acid labile groups of two or more types when properties of a chemically amplified positive resist composition having the polymer blended as a base resin are taken into account. For the acid labile groups of two or more types, a combination of an alkoxyalkyl group of formula (16) and a group of formula (17) is preferred.

In formulae (1) to (3), n is equal to 2 or 3. For the following reason, 2 or 3 is selected for n. Decomposition of an acid labile group leaves a hydroxyl group. As the number of hydroxyl groups increases to 2 or 3, acidity increases and arbitrary control of an alkali dissolution rate becomes possible. Letter m is 1, 2 or 3, with m=2 being preferred for ease of synthesis and control of an alkali dissolution rate.

In formula (2), p and q are positive numbers and r and s are 0 or positive numbers satisfying $0<(p+q)/(p+q+r+s)\leq 1$, preferably $0<(p+q)/(p+q+r+s)\leq 0.7$, more preferably $0.05 \leq (p+q)/(p+q+r+s) \leq 0.7$. In formula (3), t and q are positive numbers and r and s are 0 or positive numbers satisfying $0<(t+q)/(t+q+r+s)\leq 0.7$, more preferably $0.05\leq(t+q)/(t+q+r+s)\leq 0.7$. If p, q or t is 0, the results are less contrast of alkali dissolution rate and poor resolution. If $(p+q)/(p+q+r+s)$ or $(t+q)/(t+q+r+s)$ is more than 0.7, the resist film would undergo thickness variation, internal stressing or bubbling upon alkali development and lose its adhesion to the underlying substrate due to lesser hydrophilic groups.

The ratio of p or t to the sum of (p+q+r+s) or (t+q+r+s) is preferably between 0.05 and 0.8 in molar ratio, especially between 0.05 and 0.5. The ratio of q to the sum of (p+q+r+s) or (t+q+r+s) is preferably between 0.2 and 0.95 in molar ratio, especially between 0.3 and 0.95. The preferred range of r and s is 0 to 0.5, especially 0.05 to 0.3 for both.

In the polymers of formulae (1) to (3), the content of acid labile group affects the contrast of a dissolution rate of resist film and is closely related to properties of resist film such as pattern size control and pattern configuration.

The polymers of formulae (1) to (3) should have a weight average molecular weight of 3,000 to 300,000, preferably 3,000 to 30,000 (the measurement of weight average molecular weight will be described later). With a weight average molecular weight of less than 3,000, resists would be less resistant to heat. With a weight average molecular weight of more than 300,000, alkali solubility lowers and a footing phenomenon would be likely to occur after patterning. In formulae (2) and (3), the sum of (p+q+r+s) or (t+q+r+s) is a sufficient number to give a weight average molecular weight within this range.

A polymer having a wide molecular weight dispersity (Mw/Mn) contains more polymers of low molecular weight and high molecular weight. The presence of more polymers of low molecular weight can lead to a loss of heat resistance. The presence of more polymers of high molecular weight which are less soluble in alkali can cause a footing phenomenon after patterning. As a consequence, the influence of a molecular weight and its dispersity becomes greater as the pattern rule becomes finer. In order that a resist material be advantageously used in patterning features to a finer size, the polymer should preferably be a monodisperse one having a molecular weight dispersity of 1.0 to 1.5, especially 1.0 to 1.3.

The polymer comprising a recurring unit of formula (1) can be prepared by radical polymerization or living anion polymerization of a monomer of the following formula (i). Alternatively, the polymer can be prepared by effecting radical polymerization or living anion polymerization of a monomer of the following formula (ii), partially hydrolyzing the resulting polymer, and partially deprotecting its protective group $R^7$ (that is, deprotecting so as to leave at least one protective group and generate at least one hydroxyl group). Moreover, the polymer can also be prepared by copolymerizing at least two types of monomers of formula (i) or (ii). Where monomers of formula (ii) are used, subsequent partial hydrolysis yields a polymer comprising at least two types of units of formula (1).

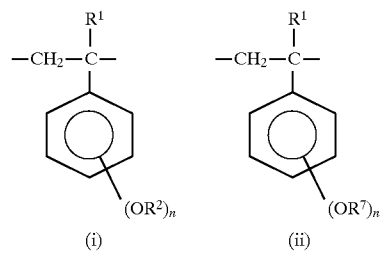

$R^1$, $R^2$, $R^7$, and n are as defined previously.

In preparing the polymer of formula (2), radical polymerization or living anion polymerization of a monomer of formula (i) with a monomer of the following formula (iii) and optionally a monomer of formula (iv) and/or a monomer of formula (v) may be used. In preparing the polymer of formula (3), radical polymerization or living anion polymerization of a monomer of formula (ii) with a monomer of formula (iii) and optionally a monomer of formula (iv) and/or a monomer of formula (v) may be used. For each of these monomers, two or more types can be used.

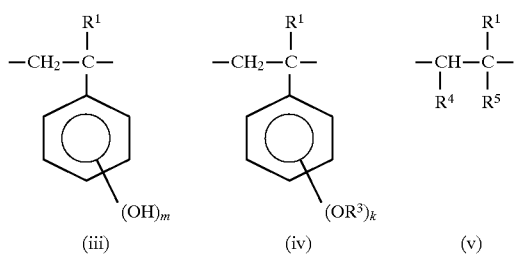

$R^1$, $R^3$, $R^4$, $R^5$, m, and k are as defined previously.

When the polymer is applied to resist materials patternable to a finer pattern rule, a monodisperse polymer is preferred for the above-mentioned reason. Monodisperse polymers are generally prepared by fractionating a polymer formed by radical polymerization and having a wide molecular weight dispersity or by effecting living anion polymerization so as to be monodisperse. Since the former fractionating method is complex, the latter living anion polymerization method is desirably used. Some copolymers are desirably formed by radical polymerization because some monomers are not living anion polymerizable.

Where polymers of the invention are prepared by radical (co)polymerization, radical polymerization of a monomer or monomers of the above-defined formula(e) is first carried out in a conventional manner using a polymerization initiator. Any of conventional polymerization initiators may be used in a conventional amount. Preferred are organic peroxides, especially organic peroxides having a 10-hour half-life temperature of 40° to 90° C. such as lauroyl peroxide.

The radical polymerization is preferably carried out in organic solvents. Useful organic solvents include aromatic hydrocarbon, cyclic ether, aliphatic hydrocarbon solvents such as benzene, toluene, tetrahydrofuran (THF), dioxane, tetrahydropyran, dimethoxyethane, n-hexane; and cyclohexane and mixtures thereof. Acetone is most preferred. The organic solvents may be used so as to give a monomer concentration of 10 to 50% by weight.

Radical polymerization conditions may be properly adjusted. Typically, reaction is carried out for about 3 to 10 hours at a temperature which is 20° to 50° C. higher than the 10-hour half-life temperature of the organic peroxide.

Where polymers of the invention are prepared by living anion polymerization, well-known living anion polymerization initiators may be used. Particularly when it is desired to obtain a monodisperse polymer, organometallic compounds are preferably used among other living anion polymerization initiators. Useful organometallic compounds are organic alkali metal compounds such as n-butyl lithium, sec-butyl lithium, tert-butyl lithium, naphthalene sodium, naphthalene potassium, anthracene sodium, α-methylstyrenetetramerdi sodium, cumyl potassium, and cumyl cesium. The amount of living anion polymerization initiator added is determined from a design molecular weight (=weight of monomer/moles of initiator).

Living anion polymerization of the monomers is generally carried out in organic solvents. The organic solvents used herein are the same as mentioned for the radical polymerization, with tetrahydrofuran being especially preferred.

Adequate polymerization takes place when the monomers are present in a concentration of 1 to 30% by weight. Reaction is preferably carried out by agitating the reaction solution in high vacuum or in an inert gas atmosphere such as argon and nitrogen. The reaction temperature may be selected from a wide range from −78° C. to the boiling point of the reaction solution used. A temperature of −78° C. to 0° C. is preferred for the tetrahydrofuran solvent and room temperature is preferred for the benzene solvent.

Polymerization reaction proceeds for about 10 minutes to about 7 hours and can be stopped by adding a stopper such as methanol, water and methyl bromide to the reaction solution.

The living anion polymerization can produce a polymer having a molecular weight dispersity which is monodisperse, that is, Mw/Mn=1.0 to 1.5 because the monomer can be reacted 100% and the molecular weight be properly adjusted.

It is noted that the weight average molecular weight (Mw) of a polymer can be calculated from the weight of a monomer used and the moles (or number of molecules) of an initiator and measured by a light scattering method. The number average molecular weight (Mn) can be measured using a diaphragm osmometer. The molecular structure can be readily acknowledged by infrared (IR) absorption spectroscopy and $^1$H-NMR spectroscopy. The molecular weight dispersity can be determined by gel permeation chromatography (GPC).

One preferred process of preparing a polymer of the invention is in accord with the reaction scheme shown below involving the steps of effecting radical polymerization or living anion polymerization of monomers of formulae (vi), (vii), and (v) to form a polymer of formula (18), hydrolyzing the polymer, and protecting some of the hydroxyl groups resulting from hydrolysis by chemical reaction with a first acid labile group of formula (16) and a second acid labile group of formula (17), for example.

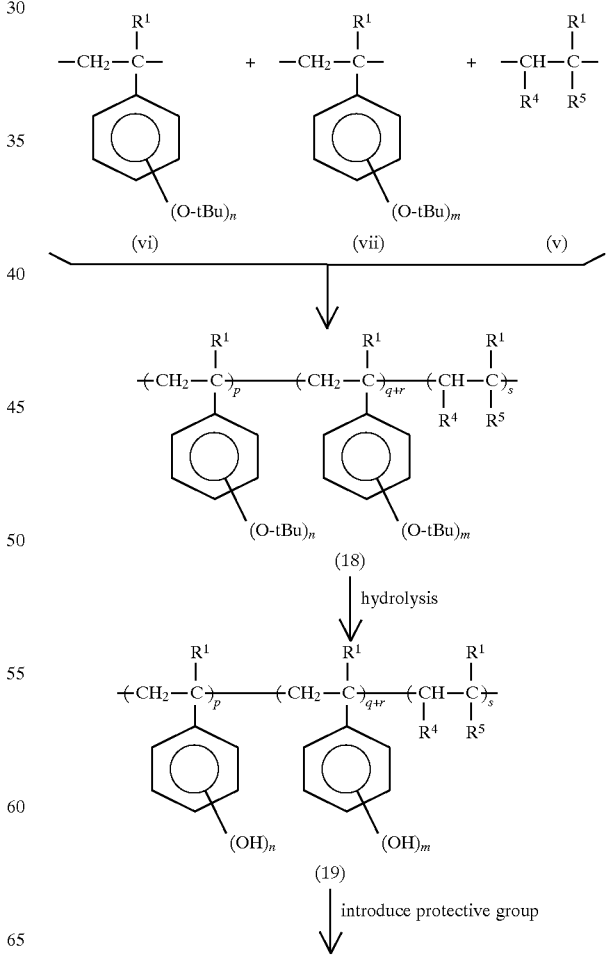

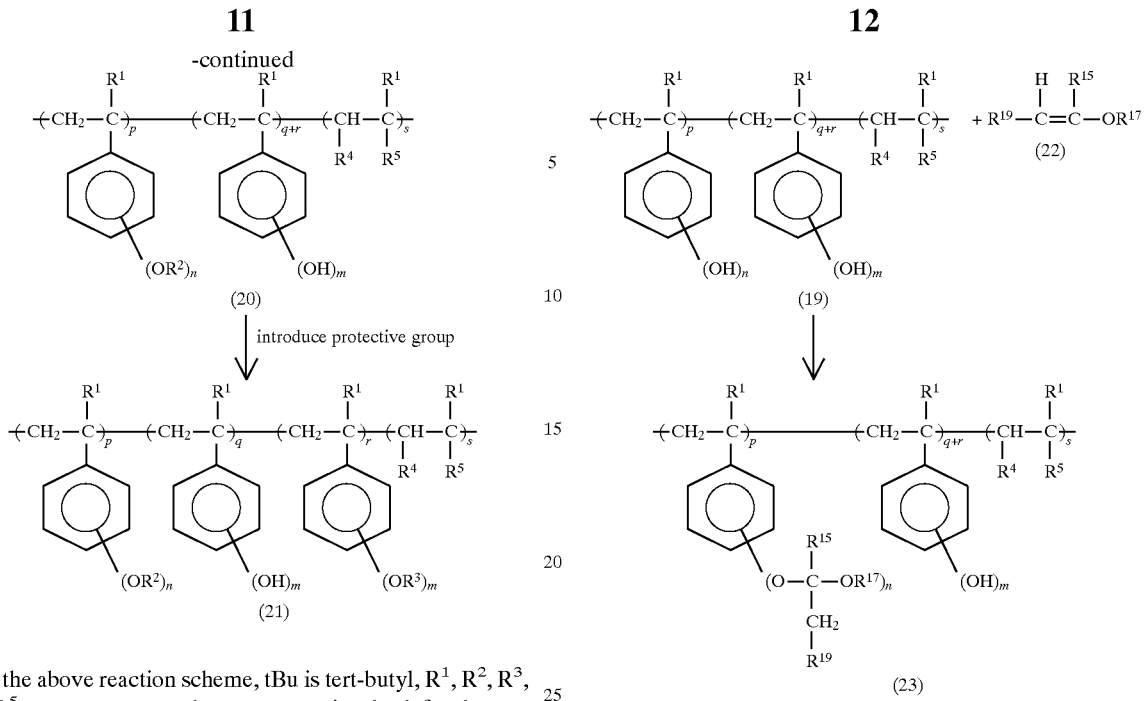

In the above reaction scheme, tBu is tert-butyl, $R^1$, $R^2$, $R^3$, $R^4$, $R^5$, n, m, p, q, r, and s are as previously defined.

In the above reaction scheme, a tert-butyl group of a polymer of formula (18), preferably a polymer of formula (18) having a weight average molecular weight of 3,000 to 300,000 and a molecular weight dispersity of 1.0 to 1.5 is hydrolyzed to form a polyhydroxystyrene derivative of formula (19). As shown by formulae (20) and (21), some of the hydroxyl groups resulting from hydrolysis are successively protected with acid labile groups represented by $R^2$ and $R^3$, thereby obtaining a polymer of formula (21) which is monodisperse (that is, has a molecular weight dispersity of 1.0 to 1.5) and has a weight average molecular weight of 3,000 to 300,000.

In particular, for hydrolysis of a polymer of formula (18), more specifically hydrolysis of a tert-butyl group which is a protective group for its hydroxyl group, an appropriate amount of acid such as hydrochloric acid and hydrobromic acid is added dropwise to a solution of the polymer in a solvent mixture of dioxane, acetone, acetonitrile, benzene, water and so forth. This procedure readily produces a hydroxyl-bearing polyhydroxystyrene derivative of formula (19) having a controlled molecular weight dispersity because neither cleavage of the polymer backbone nor cross-linking reaction between molecules occurs during reaction.

After the protective group for the hydroxyl group is detached by hydrolysis as mentioned above, acid labile groups represented by $R^2$ and $R^3$ can be introduced through chemical reaction.

This reaction scheme is advantageous particularly when a polymer wherein $R^2$ is an alkoxyalkyl group is obtained. The alkoxyalkylation reaction is effected by adding a hydrogen atom of a hydroxyl group of the polyhydroxystyrene derivative of formula (19) to a vinyl group of an ether compound of the following formula (22) in the presence of an acid catalyst, thereby protecting some of hydroxyl groups of the polyhydroxystyrene (in an amount of p mol per mol of the entire hydroxyl group) with alkoxyalkyl groups.

$R^1$, $R^4$, $R^5$, $R^{15}$, $R^{17}$, n, m, p, q, r, and s are as previously defined, and $R^{19}$ is a hydrogen atom or normal, branched or cyclic alkyl group of 1 to 5 carbon atoms.

The ether compounds of formula (22) are vinyl ether, propenyl ether, and so forth. This reaction is preferably carried out in a solvent such as dimethylformamide, tetrahydrofuran, and dimethylacetamide. Exemplary acids are hydrochloric acid, sulfuric acid, p-toluenesulfonic acid, methanesulfonic acid, and pyridinium p-toluenesulfonate and they are preferably used in an amount of 0.1 to 10 mol % per mol of the entire hydroxyl group of the polyhydroxystyrene. The reaction temperature is preferably room temperature to 60° C. and the reaction time is generally about 1 to 20 hours.

Where some of hydroxyl groups of the polyhydroxystyrene are methoxymethylated, an alkali halide such as NaH and a halomethyl ether such as chloromethyl ether are preferably reacted with the polyhydroxystyrene in a solvent such as dimethylsulfoxide and tetrahydrofuran. In this case, the amount of alkali halide used is preferably determined such that methoxymethyl groups are introduced in an appropriate amount per mol of the entire hydroxyl groups of the polyhydroxystyrene. The reaction temperature is preferably 0° to 50° C. and the reaction time is generally about 1 to 20 hours.

After the alkoxyalkylation reaction, tert-butoxycarbonylation or tert-butoxycarbonylmethylation reaction is carried out for introducing an acid labile group $R^3$.

The tert-butoxycarbonyl-introducing reaction may be carried out by reacting the partially alkoxyalkylated polyhydroxystyrene with di-tert-butyl dicarbonate in a solvent such as pyridine and tetrahydrofuran. Di-tert-butyl dicarbonate is used herein in an amount to introduce q mol of tert-butoxycarbonyl group per mol of the entire hydroxyl groups of the polyhydroxystyrene. The reaction temperature is preferably room temperature to 50° C. and the reaction time is generally about ½ to 4 hours.

The tert-butoxycarbonylmethyl-introducing reaction may be carried out by reacting the partially alkoxyalkylated polyhydroxystyrene with potassium tert-butoxide and tert-butoxycarbonylmethyl bromide in a solvent such as dimethyl sulfoxide and tetrahydrofuran. Potassium tert-butoxide is used herein in an amount to introduce q mol of tert-butoxycarbonylmethyl group per mol of the entire hydroxyl groups of the polyhydroxystyrene. The amount of tert-butoxycarbonylmethyl bromide used is equimolar to the potassium tert-butoxide. The reaction temperature is preferably room temperature to 50° C. and the reaction time is generally about ⅓ to 10 hours.

Also, the tetrahydropyranyl-incorporating reaction may be carried out by reacting with dihydropyran in tetrahydrofuran. The tetrahydrofuranyl-incorporating reaction may be carried out by reacting with dihydrofuran in tetrahydrofuran. Alkylation reaction may be carried out by reacting with isobutene in tetrahydrofuran. Trialkylsilylation reaction may be carried out by reacting with a trialkylsilyl chloride in the presence of imidazole. The reaction temperature is preferably room temperature to 50° C. and the reaction time is generally about 1 to 5 hours.

Among these reactions, it is advantageous to introduce a tert-butoxycarbonyl or tert-butoxycarbonylmethyl group because a polymer of the following general formula (24) can be produced thereby.

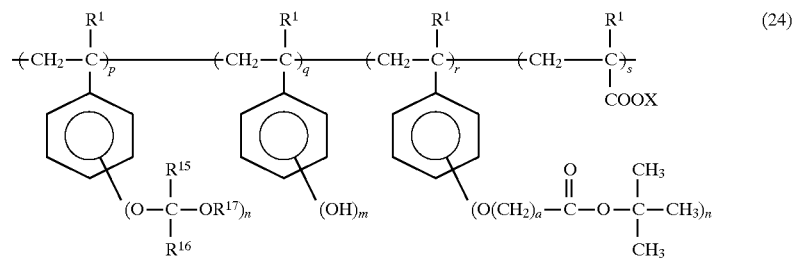

$R^1, R^{15}, R^{16}, R^{17}, X, n, m, p, q, r, s,$ and a are as previously defined.

The polymer of the invention can also be obtained by effecting radical polymerization or living anion polymerization of a monomer of the following formula (viii) to form a polymer of formula (25), hydrolyzing an acetal group of the polymer, and protecting some of the resultant hydroxyl groups with an appropriate acid labile group.

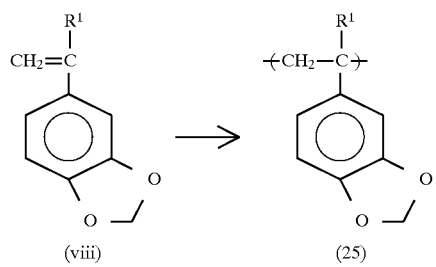

In the second aspect, the present invention provides a chemically amplified positive resist composition. The resist composition is defined in form (I) as comprising components (A), (B), and (C), in form (II) as comprising components (A), (B), (C), and (D), in form (III) as comprising components (A), (B), (C), and (E), and in form (IV) as comprising components (A), (B), (C), (D), and (E).

Component (A) is an organic solvent.
Component (B) is the above-mentioned polymer as a base resin.
Component (C) is a photoacid generator.
Component (D) is a dissolution regulator in the form of a compound having a weight average molecular weight of 100 to 1,000 and at least two phenolic hydroxyl groups in a molecule, the hydrogen atom of the phenolic hydroxyl group being replaced by an acid labile group in an average amount of 10 to 100% of the entire phenolic hydroxyl groups.

Component (E) is a dissolution regulator in the form of a compound having a weight average molecular weight of more than 1,000 to 3,000 and a phenolic hydroxyl group in a molecule, the hydrogen atom of the phenolic hydroxyl group being partially replaced by an acid labile group in an average amount of more than 0% to 60% of the entire phenolic hydroxyl groups.

The components other than (B) are described in detail.

The organic solvent (A) may be any desired one of organic solvents in which a photoacid generator, base resin and dissolution regulator are soluble. Exemplary organic solvents include ketones such as cyclohexanone and methyl-2-n-amyl ketone; alcohols such as 3-methoxybutanol, 3-methyl-3-methoxybutanol, 1-methoxy-2-propanol, and 1-ethoxy-2-propanol; ethers such as propylene glycol monomethyl ether, ethylene glycol monomethyl ether, propylene glycol monoethyl ether, ethylene glycol monoethyl ether, propylene glycol dimethyl ether, and diethylene glycol dimethyl ether; and esters such as propylene glycol monomethyl ether acetate, propylene glycol monoethyl ether acetate, ethyl lactate, ethyl pyruvate, butyl acetate, methyl 3-methoxypropionate, and ethyl 3-ethoxypropionate alone or in admixture of two or more. Among these organic solvents, diethylene glycol dimethyl ether and 1-ethoxy-2-propanol are preferred because the photoacid generator is most soluble therein.

The amount of the organic solvent used is preferably about 200 to 1,000 parts by weight, especially about 400 to 800 parts by weight per 100 parts by weight of the base resin. With less than 200 parts of the organic solvent, the respective components would be less miscible and film formation be sometimes difficult. A composition containing more than 1,000 parts of the organic solvent would form a too thin resist film.

The photoacid generator (C) may be selected, for example, from onium salts, sulfonated compounds, halo-compounds, and triazines. Onium salts and sulfonated compounds are preferred, inter alia. Non-limiting examples of the onium salt include triphenylsulfonium triflates and triphenylsulfonium tosylates. Non-limiting examples of the sulfonated compound include alkylsulfonates and azidosulfonates. The amount of the photoacid generator added is preferably about 1 to 20 parts by weight, especially about 2 to 10 parts by weight per 100 parts by weight of the base resin.

To the resist composition of the invention, a dissolution regulator (D) may be added. It is a compound having a weight average molecular weight of 100 to 1,000 and at least two,phenolic hydroxyl groups in a molecule wherein the hydrogen atom of the phenolic hydroxyl group is replaced by an acid labile group in an average amount of 10 to 100% of the entire phenolic hydroxyl groups. The compound has a weight average molecular weight of 100 to 1,000, preferably 150 to 800. The percent substitution of an acid labile group for the hydrogen atom of the phenolic hydroxyl group is on average at least 10%, preferably at least 30% of the entire phenolic hydroxyl groups. With a substitution rate of less than 10%, edge roughness occurs. The upper limit of substitution rate is 100%, preferably 80%.

Preferred examples of the phenolic hydroxyl group-bearing compound are given below by formulae (4) to (14). In these compounds, the hydrogen atom of the phenolic hydroxyl group is replaced by an acid labile group.

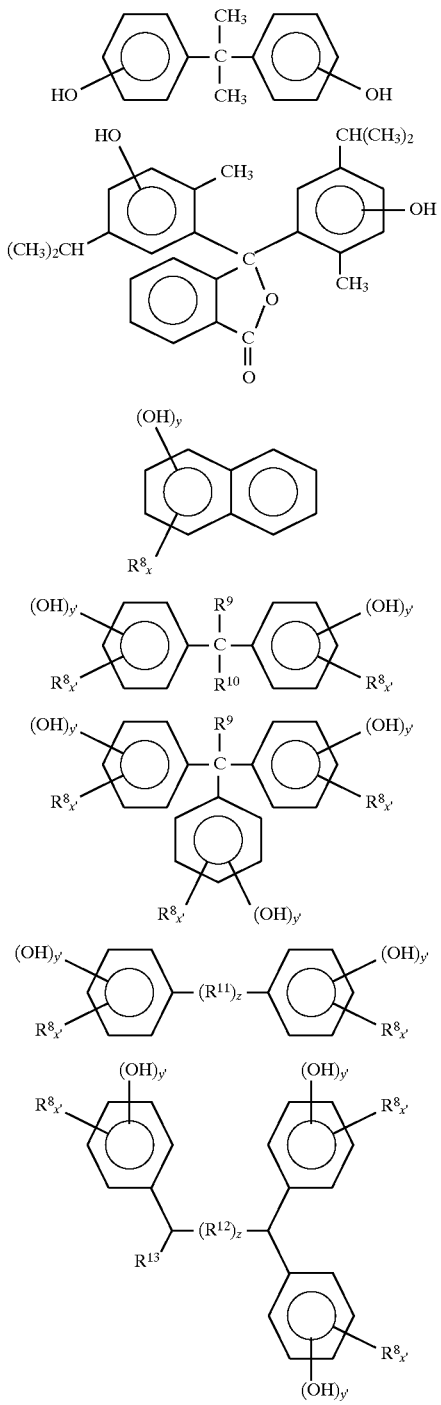

-continued

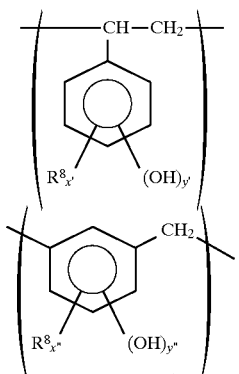

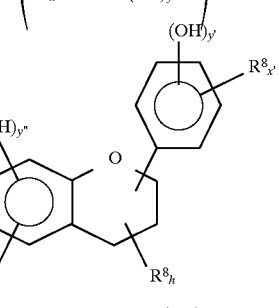

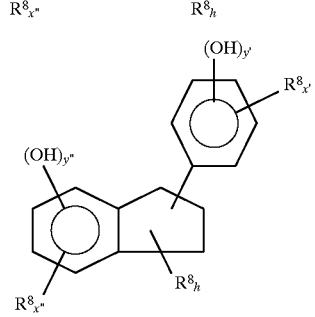

$R^8$ and $R^9$ are independently a hydrogen atom, normal or branched alkyl or alkenyl group of 1 to 8 carbon atoms. $R^{10}$ is a hydrogen atom, normal or branched alkyl or alkenyl group of 1 to 8 carbon atoms or $-(R^{14})_z-$ COOH. $R^{11}$ and $R^{12}$ are independently an alkylene group of 1 to 10 carbon atoms, arylene group, carbonyl group, sulfonyl group, oxygen atom or sulfur atom. $R^{13}$ is an alkyl or alkenyl group of 1 to 8 carbon atoms, hydrogen atom, hydroxyl-substituted phenyl group or hydroxyl-substituted naphthyl group. $R^{14}$ is a normal or branched alkylene group of 1 to 10 carbon atoms. Letter h is an integer of 0 to 3, and z is equal to 0 or 1. Letters x, y, x', y', x", and y" are such numbers in the range: x+y=8, x'+y'=5, and x"+y"=4 that at least one hydroxyl group is contained in each phenyl skeleton.

Exemplary groups of R's are as follows. $R^8$ and $R^9$ may be hydrogen atom, methyl, ethyl, propyl, butyl, ethynyl, and cyclohexyl. $R^{10}$ may be hydrogen atom, methyl, ethyl, propyl, butyl, and cyclohexyl as well as —COOH and —CH$_2$COOH. $R^{11}$ and $R^{12}$ may be methylene, ethylene, phenylene, carbonyl, sulfonyl, oxygen atom, and sulfur atom. $R^{13}$ may be methyl, ethyl, butyl, propyl, ethynyl, cyclohexyl, hydrogen atom, hydroxyl-substituted phenyl group, and hydroxyl-substituted naphthyl group.

Examples of the acid labile group for the dissolution regulator include groups of formulae (16) and (17), tert-butyl, tetrahydropyranyl, tetrahydrofuranyl, trialkylsilyl, and β-ketoalkyl groups.

The compounds having-at least some phenolic hydroxyl groups replaced by acid labile groups as dissolution regulators (D) may be used alone or in admixture of two or more. The amount of this compound blended as dissolution regulator (D) is preferably 0 to about 50 parts by weight, more preferably about 5 to 50 parts by weight, most preferably about 10 to 30 parts by weight per 100 parts by weight of the base resin. Less than 5 parts of the compound would be too small to improve resolution. More than 50 parts of the compound would cause a loss of thickness of pattern film, resulting in low resolution.

The dissolution regulator (D) defined above can be synthesized by chemically reacting an acid labile group with a compound having a phenolic hydroxyl group in a similar manner to the base resin.

The chemically amplified positive resist composition of the invention may contain another dissolution regulator (E) instead of or in addition to the dissolution regulator (D). The dissolution regulator (E) is a compound having a weight average molecular weight of more than 1,000 to 3,000 and a phenolic hydroxyl group in a molecule wherein the hydrogen atom of the phenolic hydroxyl group is partially replaced by an acid labile group in an average amount of more than 0% to 60%, preferably more than 0% to 40% of the entire phenolic hydroxyl groups. A compound with a substitution rate of 0% is less effective for dissolution control whereas a compound with a substitution rate of less than 60% causes phase separation between polymers and a loss of compatibility.

The compounds having some phenolic hydroxyl groups replaced by acid labile groups as dissolution regulator (E) may be used alone or in admixture of two or more. They are preferably compounds having a recurring unit of the following general formula (15):

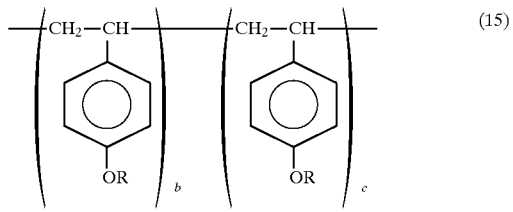

wherein R is an acid labile group, and letters b and c are numbers satisfying $0<b/(b+c)\leq 0.6$.

Examples of the acid labile group for the dissolution regulator include alkoxyalkyl groups of formula (16), carbonyl-containing groups of formula (17), tert-butyl, tetrahydropyranyl, trialkylsilyl, and β-ketoalkyl groups.

The amount of this compound blended as dissolution regulator (E) is preferably 0 to about 50 parts by weight, more preferably about 1 to 50 parts by weight, most preferably about 1 to 30 parts by weight per 100 parts by weight of the base resin. Less than 1 parts of the compound would be too small to improve resolution. More than 50 parts of the compound would cause a loss of thickness of pattern film, resulting in low resolution.

The dissolution regulator (E) defined above can be synthesized by chemically reacting an acid labile group with a compound having a phenolic hydroxyl group in a similar manner to the base resin.

As mentioned above, the dissolution regulators (D) and (E) may be used separately or in admixture.

The chemically amplified positive resist composition of the invention may further contain (F) a basic compound as an additive. The basic compound blended as additive (F) is preferably a compound capable of suppressing the rate of diffusion of an acid resulting from the photoacid generator into a resist film. Since the rate of diffusion of acid in the resist film is suppressed by blending such a basic compound, there are obtained many advantages including improved resolution, suppressed change of sensitivity after exposure, reduced dependency on the substrate and environment, improved latitude of exposure, and improved pattern profile. The basic compound used herein encompasses primary, secondary and tertiary aliphatic amines, mixed amines, aromatic amines, heterocyclic amines, nitrogenous compounds having a carboxyl group, nitrogenous compounds having a sulfonyl group, nitrogenous compounds having a hydroxyl group, nitrogenous compounds having a hydroxyphenyl group, alcoholic nitrogenous compounds, and amide derivatives.

Examples of the primary aliphatic amine include ammonia, methylamine, ethylamine, propylamine, butylamine, pentylamine, amylamine, hexylamine, heptylamine, octylamine, nonylamine, decylamine, laurylamine, cetylamine, methylenediamine, ethylenediamine, and tetraethylenediamine. Examples of the secondary aliphatic amine include dimethylamine, diethylamine, dipropylamine, dibutylamine, dipentylamine, dihexylamine, diheptylamine, dioctylamine, dinonylamine, didecylamine, dimethylmethylenediamine, dimethylethylenediamine, and dimethyltetraethylenediamine. Examples of the tertiary aliphatic amine include trimethylamine, triethylamine, tripropylamine, tributylamine, tripentylamine, trihexylamine, triheptylamine, trioctylamine, tetramethylmethylenediamine, tetramethylethylenediamine, and tetramethyltetraethylenediamine.

Examples of the mixed amine include dimethylethylamine and methylethylpropylamine. Examples of the aromatic and heterocyclic amines include benzylamine, phenethylamine, benzyldimethylamine, aniline derivatives (e.g., aniline, N-methylaniline, N-ethylaniline, N-propylaniline, N,N-dimethylaniline, 2-methylaniline, 3-methylaniline, 4-methylaniline, ethylaniline, propylaniline, trimethylaniline, 4-nitroaniline, and dinitroaniline), toluidine derivatives (e.g., toluidine and N,N-dimethyltoluidine), quinoline, aminobenzoic acid, N-phenylphenyltolylamine, N-methyldiphenylamine, triphenylamine, phenylenediamine, naphthylamine, diaminonaphthalene, pyrrole derivatives (e.g., pyrrole, methylpyrrole, dimethylpyrrole, and N-methylpyrrole), imidazole derivatives (e.g., imidazole, 4-methylimidazole, and 4-methyl-2-phenylimidazole), oxazole derivatives, thiazole derivatives, pyrazole derivatives, pyrrolidine derivatives (e.g., pyrrolidine, N-methylpyrrolidone, and N-methylpyrrolidine), pyrroline derivatives, pyridine derivatives (e.g., pyridine, methylpyridine, ethylpyridine, propylpyridine, butylpyridine, 5-butyl-2-methylpyridine, trimethylpyridine, triethylpyridine, phenylpyridine, 3-methyl-2-phenylpyridine, tert-butylpyridine, diphenylpyridine, benzylpyridine, methoxypyridine, butoxypyridine, dimethoxypyridine, 1-methyl-2-pyridone, 4-pyrrolidinylpyridine, 1-methyl-4-phenylpyridine, and 2-(1-ethylpropyl)pyridine), piperidine derivatives, pyrimidine derivatives, purine derivatives, quinoline derivatives, carbazole derivatives, indole derivatives, nicotinamide derivatives, adenosine derivatives, adenine derivatives, thiabenzole, and diaminosulfone.

Examples of the nitrogenous compound having a carboxyl group include amino acid derivatives (e.g., nicotinic acid, alanine, alginine, aspartic acid, glutamic acid, glycine, histidine, isoleucine, glycylleucine, leucine, methionine, phenylalanine, threonine, lysine, 3-aminopyrazine-2-carboxylic acid, and methoxyalanine. Examples of the nitrogenous compound having a sulfonyl group, nitrogenous compound having a hydroxyl group, nitrogenous compound having a hydroxyphenyl group, and alcoholic nitrogenous compound include 2-hydroxypyridine, aminocresole, thiamine naphthalene disulfonate, pyridinesulfonic acid, ethanolamine, diethanolamine, triethanolamine, diisopropylamine, triisopropylamine, tripropylamine, 1-aminobutane-2-diol, 1-aminopropan-3-ol, and 1-aminobutane-2-diol. Examples of the amide derivative include formamide, N-methylformamide, N,N-dimethylformamide, acetamide, N-methylacetamide, N,N-dimethylacetamide, propionamide, and benzamide.

The amount of the basic compound blended is preferably 0 to 10 parts by weight, more preferably 0.001 to 10 parts by weight, most preferably 0.01 to 1 part by weight per part by weight of the photoacid generator. Less than 0.001 part of the basic compound would provide little additive effect. More than 10 parts of the basic compound would adversely affect resolution and sensitivity.

In the resist composition of the invention, there may be added optional components, for example, surfactants for improving applicability and light absorbing agents for reducing irregular reflection from the substrate. These optional components are added in conventional amounts insofar as the objects of the invention are not impaired. Examples of the surfactant include perfluoroalkyl polyoxyethylene ethanol, fluorinated alkyl esters, perfluoroalkylamine oxide, and perfluoroalkyl EO adducts. Exemplary light absorbing agents are diarylsulfoxide, diarylsulfone, 9,10-dimethylanthracene, and 9-fluorenone.

Any well-known lithography may be used to form a resist pattern from a chemically amplified positive resist composition of the invention. For example, the resist composition is spin coated onto a silicon wafer to a thickness of 0.5 to 2.0 μm, prebaked at 80° to 120° C., exposed to actinic radiation such as deep-ultraviolet radiation, electron beam, and X-ray, and baked at 70° to 120° C. for 30 to 200 seconds (post-exposure baking=PEB), and developed with an aqueous base solution. The resist composition of the invention is especially suitable for fine patterning with deep-ultraviolet radiation of 254 to 193 nm and electron beams.

There has been described a chemically amplified positive resist composition comprising a specific polymer as a base resin. It is sensitive to actinic radiation and improved in sensitivity, resolution, and plasma etching resistance while the resulting resist pattern is well resistant to heat. It has improved size control in that the resist pattern is relatively free of overhang. Owing to these advantages, the resist composition of the invention ensures that the resist material has reduced absorption at the exposure wavelength of a KrF excimer laser and forms a fine pattern having side walls perpendicular to the substrate. It is suitable as a fine pattern-forming material for the manufacture of ultra-LSIs.

EXAMPLE

Examples of the present invention are given below by way of illustration and not by way of limitation.

Synthesis Example 1

A 500-ml flask was charged with 1 gram of lauryl peroxide, 75 grams of 3-tert-butoxycarbonyloxy-4-hydroxystyrene, and 1,000 ml of acetone. The flask was purged with nitrogen. The mixture was heated at 90° C. for 5 hours for polymerization reaction. At the end of polymerization reaction, the reaction product was washed with methanol and dried, obtaining a polymer of the rational formula shown below in a yield of 98%. This polymer designated Polym 1 had a weight average molecular weight (Mw) and dispersity (Mw/Mn) as shown in Table 1. On proton-NMR analysis, a peak attributable to a tert-BOC group was observed at 1.5 ppm.

Synthesis Examples 2–13

Polymers designated Polym 2 to 13 were obtained by the same procedure as Synthesis Example 1 except that the monomers shown below were used. The polymers had a structure as shown by their rational formula and a weight average molecular weight (Mw) and dispersity (Mw/Mn) as shown in Table 1.

Synthesis Example 2

3-tetrahydropyranyloxy-4-hydroxystyrene

Synthesis Example 3

3-tert-butoxycarbonyloxymethyl-4-hydroxystyrene

Synthesis Example 4

3-methoxyethoxy-4-hydroxystyrene

Synthesis Example 5

3-trimethylsilyl-4-hydroxystyrene

Synthesis Example 6

4-tert-butoxycarbonyloxy-3-hydroxystyrene
4-hydroxystyrene

Synthesis Example 7

4-tert-butoxycarbonyloxy-3-hydroxystyrene
3,4-dihydroxystyrene

Synthesis Example 8

3-tert-butoxycarbonyloxy-4-hydroxystyrene
3,4-dihydroxystyrene
4-hydroxystyrene

Synthesis Example 9

3-tert-butoxycarbonyloxy-4-hydroxystyrene
4-hydroxystyrene
4-tetrapyranyloxystyrene Synthesis Example 10

3-tert-butoxycarbonyloxy-4-hydroxystyrene
4-hydroxystyrene
3,4-di-tert-butoxycarbonyloxystyrene Synthesis Example 11

3-tert-butoxycarbonyloxy-4-hydroxystyrene
tert-butyl acrylate

Synthesis Example 12

4-tert-butoxycarbonyloxy-3-hydroxystyrene
3,4-dihydroxystyrene
hydroxystyrene

Synthesis Example 13

4-tert-butoxycarbonyloxy-3-hydroxystyrene
3-tert-butoxycarbonyloxy-4-hydroxystyrene
3,4-dihydroxystyrene
4-hydroxystyrene
4-tert-butoxycarbonyloxystyrene

Synthesis Example 14

A 2-liter flask was charged with 700 ml of tetrahydrofuran as a solvent and $2 \times 10^{-3}$ mol of sec-butyl lithium as an initiator. 40 grams of 3,4-di-tert-butoxystyrene was added to the flask contents at $-78°$ C., which was agitated for 1 hour for polymerization. The reaction solution was red. Polymerization was stopped by adding methanol to the reaction solution.

The reaction solution was then poured into methanol whereupon the reaction product precipitated. The precipitate was separated and dried, obtaining 39 grams of a white polymer which was poly(3,4-di-tert-butoxystyrene). The polymer had a weight average molecular weight of $1.8 \times 10^4$ g/mol as measured by membrane osmometry. A GPC elution curve indicative of a molecular weight distribution showed that the polymer was highly monodisperse, that is, Mw/Mn= 1.15.

In 900 ml of acetone was dissolved 30 grams of the thus obtained poly(3,4-di-tert-butoxystyrene). A small amount of conc. sulfuric acid was added to the solution at 60° C., which was agitated for 7 hours. The reaction solution was poured into water whereupon the polymer precipitated. The precipitate was washed and dried, obtaining 20 grams of a polymer. The polymer had a weight average molecular weight of $1.3 \times 10^4$ g/mol. Since no peak attributable to a tert-butyl group was observed on proton-NMR analysis, the polymer was poly(3,4-dihydroxystyrene) having a narrow molecular weight dispersity.

In 500 ml of pyridine was dissolved 50 grams of the thus obtained poly(3,4-dihydroxystyrene). With stirring at 45° C., 18 grams of di-tert-butyl dicarbonate was added to the solution. After 1 hour of reaction, the reaction solution was added dropwise to 3 liters of water whereupon a white solid precipitated. After filtration, the solid was dissolved in 50 ml of acetone and added dropwise to 2 liters of water. After filtration, the precipitate was dried in vacuum, obtaining a polymer. This polymer designated Polym 14 had a t-BOC introduction of the hydrogen atom of hydroxyl group of 20% as calculated from proton-NMR, a weight average molecular weight (Mw) and dispersity (Mw/Mn) as shown in Table 1, and a GPC elution curve as shown in FIG. 1.

Synthesis Example 15

A 2-liter flask was charged with 700 ml of tetrahydrofuran as a solvent and $2 \times 10^{-3}$ mol of sec-butyl lithium as an initiator. A mixture containing 20 grams of 4-tert-butoxystyrene and 20 grams of 3,4-di-tert-butoxystyrene was added to the flask content at $-78°$ C., which was agitated for 1 hour for polymerization. The reaction solution was red. Polymerization was stopped by adding methanol to the reaction solution.

The reaction solution was then poured into methanol whereupon the reaction product precipitated. The precipitate was separated and dried, obtaining 39 grams of a polymer which was identified to be a random copolymer consisting of 50% of 3,4-di-tert-butoxystyrene and 50% of 4-tert-butoxystyrene as analyzed by $^{13}$C-NMR. The polymer had a weight average molecular weight of $1.8 \times 10^4$ g/mol as measured by membrane osmometry. A GPC elution curve indicative of a molecular weight distribution showed that the polymer was highly monodisperse, that is, Mw/Mn=1.15.

Figure 2:
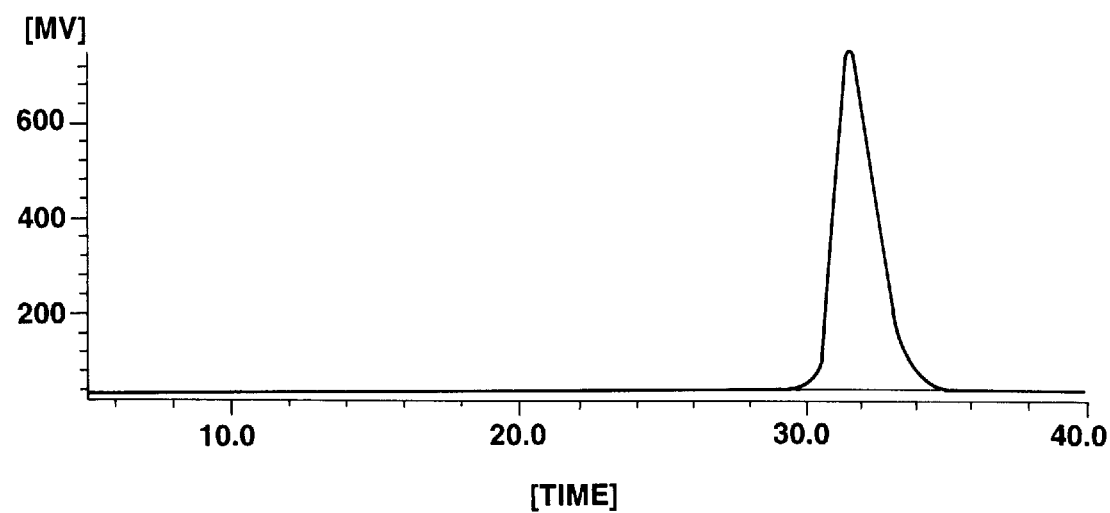
FIG. 2 is a graph showing a GPC elution curve of the polymer obtained in Synthesis Example 15.

In 300 ml of acetone was dissolved 20 grams of the random copolymer of 3,4-di-tert-butoxystyrene and 4-tert-butoxystyrene. A small amount of conc. sulfuric acid was added to the solution at 60° C., which was agitated for 6 hours. The reaction solution was poured into water whereupon the polymer precipitated. The precipitate was washed and dried, obtaining 16 grams of a polymer. The polymer had a weight average molecular weight of $1.3 \times 10^4$ g/mol. A GPC elution curve as shown in FIG. 2 indicated that it was a highly monodisperse polymer. Since no peak attributable to a tert-butyl group was observed on proton-NMR analysis, the polymer was a copolymer of 3,4-dihydroxystyrene and 4-hydroxy-styrene having a narrow molecular weight dispersity.

In 500 ml of tetrahydrofuran was dissolved 50 grams of the random copolymer of 3,4-dihydroxystyrene and 4-hydroxystyrene. A catalytic amount of p-toluene-sulfonic acid was added. With stirring at 20° C., 27 grams of ethyl vinyl ether was added to the solution. After 1 hour of reaction, the reaction solution was neutralized with conc. ammonia water and added dropwise to 10 liters of water whereupon a white solid precipitated. After filtration, the solid was dissolved in 500 ml of acetone and added dropwise to 10 liters of water. After filtration, the precipitate was dried in vacuum, obtaining a polymer. This random copolymer of 3,4-dihydroxystyrene and 4-hydroxystyrene had an ethoxyethyl introduction of the hydrogen atom of hydroxyl group of 24% as calculated from $^{13}$C-NMR.

In 500 ml of pyridine was dissolved 50 grams of the partially ethoxyethylated 3,4-dihydroxystyrene/4-hydroxystyrene random copolymer. With stirring at 45° C., 8 grams of di-tert-butyl dicarbonate was added to the solution. After 1 hour of reaction, the reaction solution was added dropwise to 3 liters of water whereupon a white solid precipitated. After filtration, the solid was dissolved in 50 ml of acetone and added dropwise to 2 liters of water. After filtration, the precipitate was dried in vacuum, obtaining a polymer. This 3,4-dihydroxystyrene/4-hydroxystyrene random copolymer, designated Polym 15, had an ethoxyethyl introduction of the hydrogen atom of hydroxyl group of 24% and a t-BOC introduction of 11% as calculated from proton-NMR, and its weight average molecular weight (Mw) and dispersity (Mw/Mn) were as shown in Table 1.

Synthesis Examples 16–22

Polymers designated Polym 16 to 22 were obtained by the same procedure as Synthesis Example 14 or 15 except that the monomers shown below were used. The polymers had a structure as shown by their rational formula and a weight average molecular weight (Mw) and dispersity (Mw/Mn) as shown in Table 1.

Synthesis Example 16

3,4-diethoxyethoxystyrene
3,4-dihydroxystyrene

Synthesis Example 17

2,3,4-tri-tert-butoxycarbonyloxystyrene
2,3,4-trihydroxystyrene

Synthesis Example 18

3,4-di-tert-butoxycarbonylmethyloxystyrene
3,4-dihydroxystyrene

Synthesis Example 19

3,4-di-tert-butoxycarbonyloxystyrene
3,4-dihydroxystyrene
4-hydroxystyrene
4-ethoxyethoxystyrene Synthesis Example 20
3,4-di-tert-butoxycarbonyloxystyrene
3,4-dihydroxystyrene
3,4-ethoxyethoxystyrene
Synthesis Example 21
3,4-di-tert-butoxycarbonylmethyloxystyrene
3,4-dihydroxystyrene
3,4-diethoxypropoxystyrene
Synthesis Example 22
3,4-di-tert-butoxycarbonyloxystyrene
3,4-dihydroxystyrene
3,4-di-n-butoxyethoxystyrene
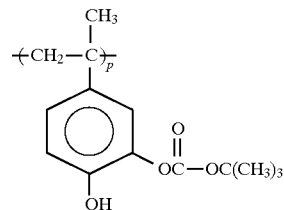 (Polym1)
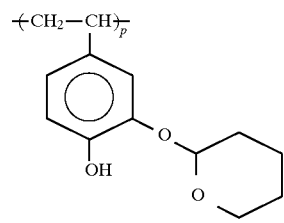 (Polym2)
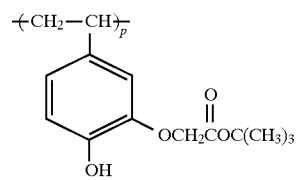 (Polym3)
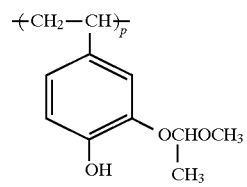 (Polym4)
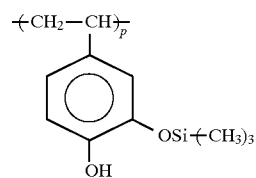 (Polym5)
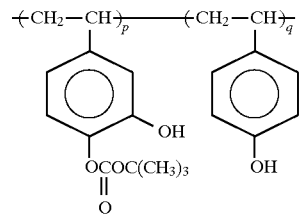 (Polym6)

-continued
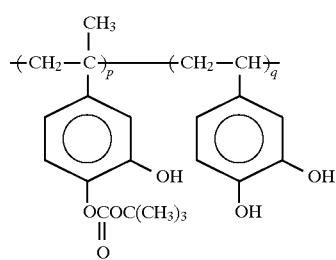 (Polym7)
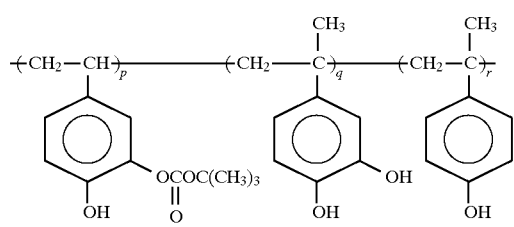 (Polym8)
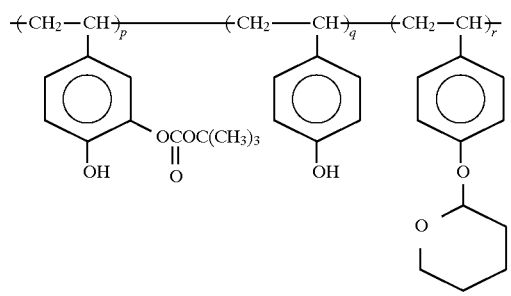 (Polym9)
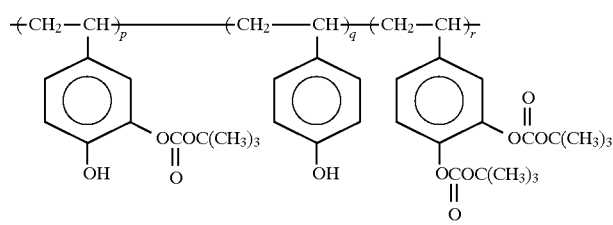 (Polym10)
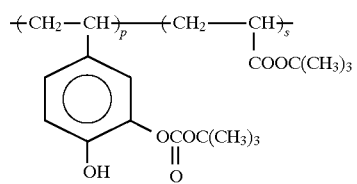 (Polym11)
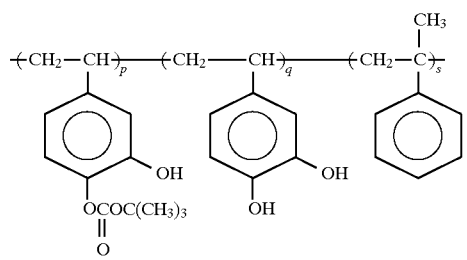 (Polym12)
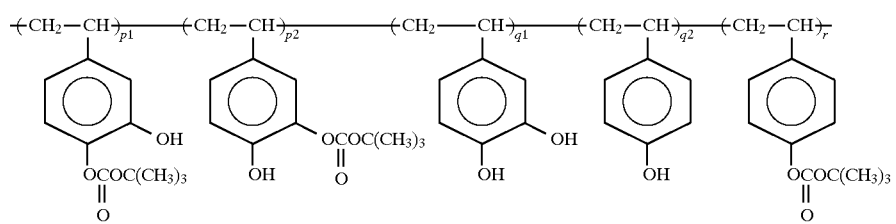 (Polym13)

-continued
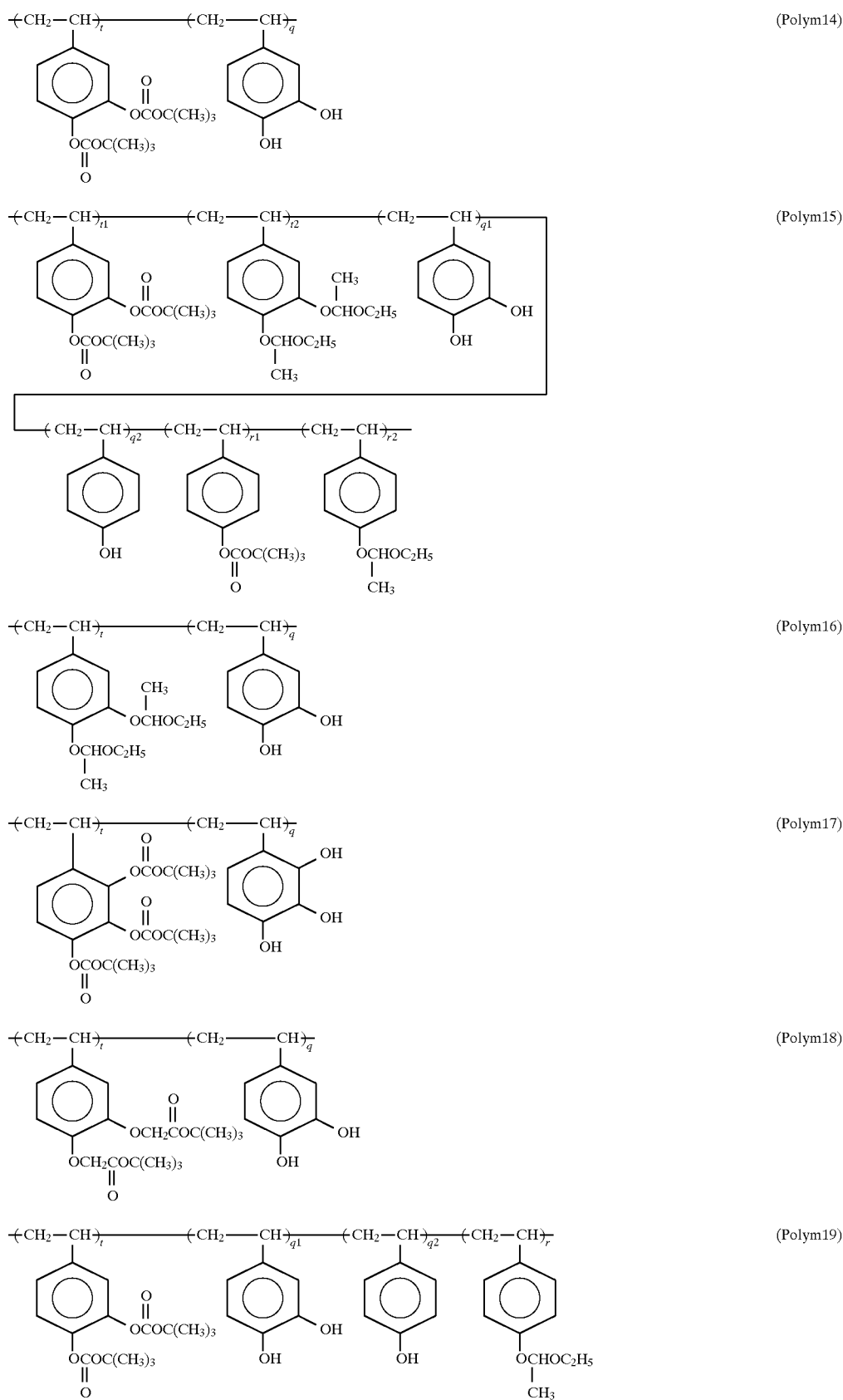

-continued

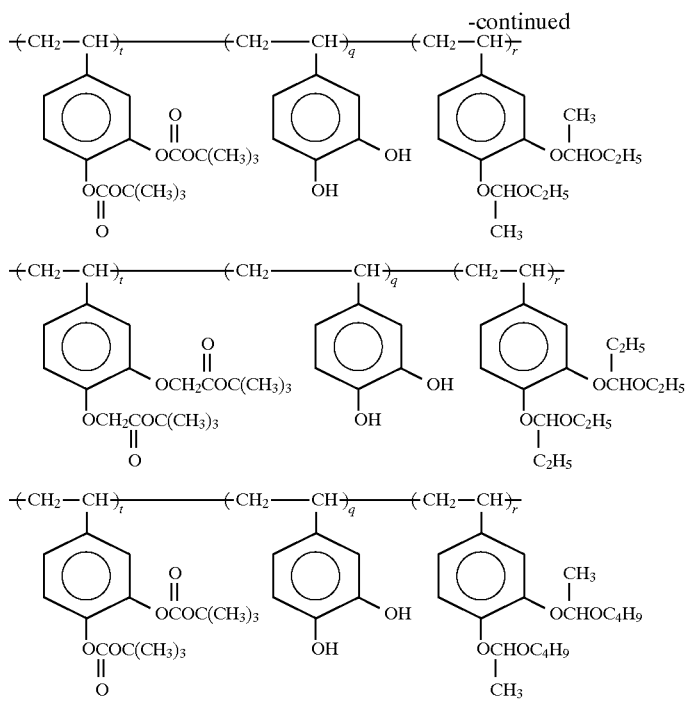

TABLE 1

| Synthesis Example | Designation | Compositional ratio | | | | | Weight average molecular weight (Mw) | Molecular weight dispersity (Mw/Mn) |
|---|---|---|---|---|---|---|---|---|
| | | p | t | q | r | s | | |
| 1 | Polym 1 | 1.0 | | | | | 13,400 | 1.78 |
| 2 | Polym 2 | 1.0 | | | | | 14,000 | 2.25 |
| 3 | Polym 3 | 1.0 | | | | | 15,000 | 2.00 |
| 4 | Polym 4 | 1.0 | | | | | 12,000 | 1.85 |
| 5 | Polym 5 | 1.0 | | | | | 12,000 | 1.65 |
| 6 | Polym 6 | 1.0 | | | | | 14,500 | 1.85 |
| 7 | Polym 7 | 0.2 | | 0.8 | | | 14,000 | 2.18 |
| 8 | Polym 8 | 0.2 | | 0.5 | 0.3 | | 14,000 | 1.85 |
| 9 | Polym 9 | 0.1 | | 0.8 | 0.1 | | 12,000 | 1.60 |
| 10 | Polym 10 | 0.1 | | 0.8 | 0.1 | | 11,000 | 1.80 |
| 11 | Polym 11 | 0.5 | | | | 0.5 | 14,000 | 2.25 |
| 12 | Polym 12 | 0.2 | | 0.75 | | 0.05 | 12,000 | 1.80 |
| 13 | Polym 13 | 0.05 0.1 | | 0.6 0.2 | 0.05 | | 14,000 | 1.90 |
| 14 | Polym 14 | | 0.2 | 0.8 | | | 13,000 | 1.15 |
| 15 | Polym 15 | | 0.055 0.12 | 0.325 0.325 | 0.055 0.12 | | 13,000 | 1.15 |
| 16 | Polym 16 | | 0.3 | 0.7 | | | 12,000 | 1.10 |
| 17 | Polym 17 | | 0.2 | 0.8 | | | 14,000 | 1.15 |
| 18 | Polym 18 | | 0.23 | 0.77 | | | 13,000 | 1.10 |
| 19 | Polym 19 | | 0.07 | 0.5 0.13 | 0.3 | | 14,000 | 1.15 |
| 20 | Polym 20 | | 0.1 | 0.7 | 0.2 | | 13,000 | 1.10 |
| 21 | Polym 21 | | 0.1 | 0.8 | 0.1 | | 14,000 | 1.15 |
| 22 | Polym 22 | | 0.1 | 0.8 | 0.1 | | 14,000 | 1.10 |

Examples and Comparative Examples

Liquid resist compositions were prepared by dissolving a polymer as a base resin, a photoacid generator, a dissolution regulator in a solvent in accordance with the formulation shown in Table 2. Each of the compositions was passed through a 0.2-μm Teflon® filter.

The polymers used were those obtained in Synthesis Examples 1 to 22, that is, Polym 1 to Polym 22.

The photoacid generators used were PAG1 to PAG10 shown below.

The dissolution regulators used were DRR1 to DRR14 and DRR1' to DRR8' shown below.

The solvents used were diethylene glycol dimethyl ether (DGLM), 1-ethoxy-2-propanol (EIPA), methyl 2-n-amyl ketone (MAK), propylene glycol monomethyl acetate (PGMMA), propylene glycol monoethyl acetate (PGMEA), and ethyl lactate/butyl acetate (EL/BA).

For comparison purposes, a liquid resist composition was similarly prepared using a polymer designated Polym 23 as a base resin.

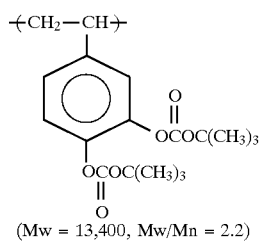
(Polym23)

(Mw = 13,400, Mw/Mn = 2.2)

Each liquid resist composition was then spin coated onto a silicon wafer to form a coating of 0.8 μm thick. With the silicon wafer rested on a hot plate at 100° C., the coating was pre-baked for 120 seconds. The film was exposed to a pattern of light by means of an excimer laser stepper model NSR-2005EX8A (manufactured by Nikon K.K., numerical aperture NA=0.5), baked at 90° C. for 60 seconds, and developed with an aqueous solution of 2.38% tetramethylammonium hydroxide, obtaining a positive pattern.

The resulting resist pattern was evaluated as follows.

First, sensitivity (Eth value) was determined.

Provided that the exposure quantity with which the top and bottom of a 0.35-μm line-and-space pattern were resolved at 1:1 was the optimum exposure (sensitivity Eop), the minimum line width of a line-and-space pattern which was recognized separate at this exposure was the resolution of a test resist. The configuration of the resist pattern resolved was observed under a scanning electron microscope. The edge roughness of a 0.25 μm line-and-space pattern was also observed under a scanning electron microscope.

The results are shown in Table 2.

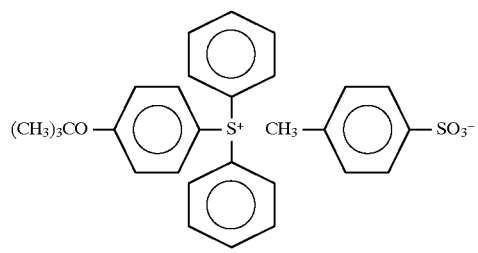
(PAG1)

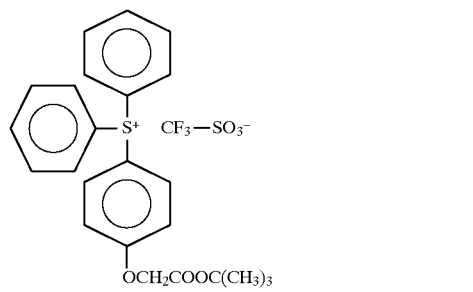
(PAG2)

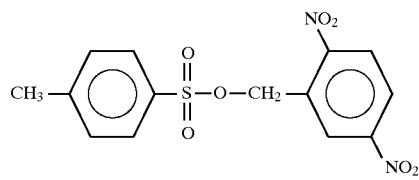
(PAG3)

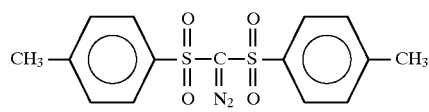
(PAG4)

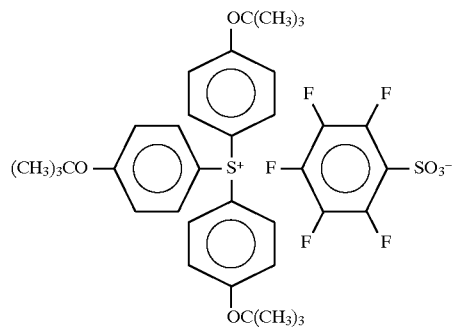
(PAG5)

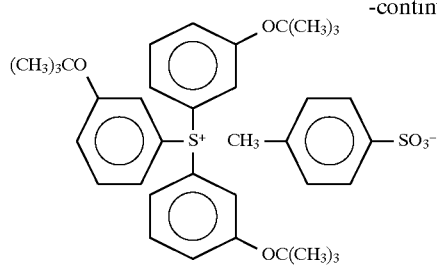
(PAG6)
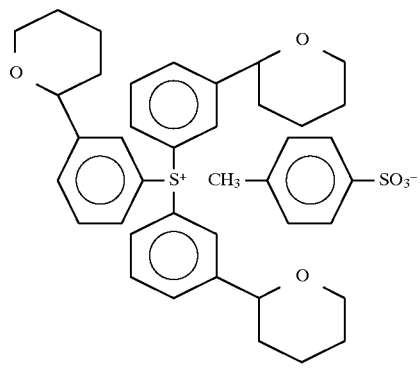
(PAG7)
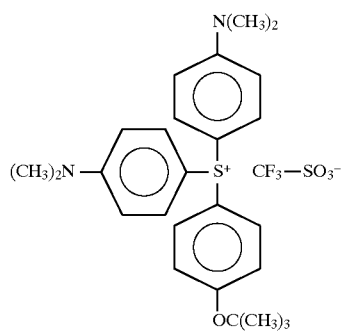
(PAG8)
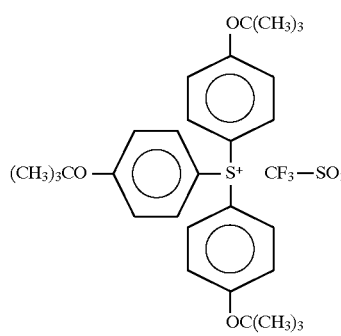
(PAG9)
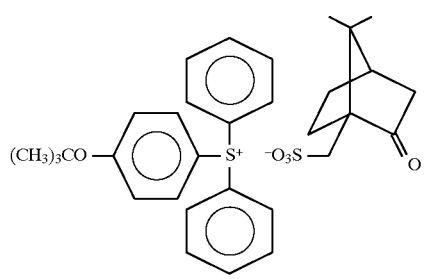
(PAG10)
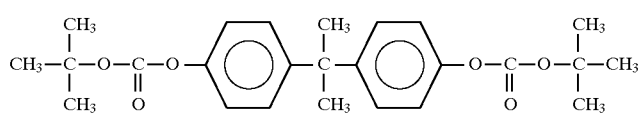
(DRR1)

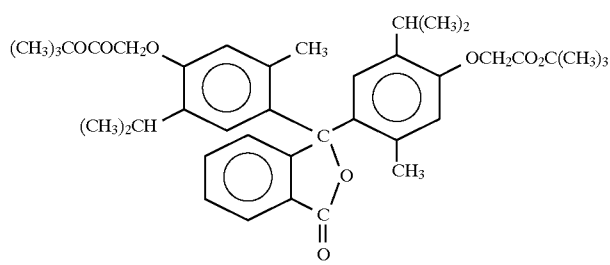 (DRR2)
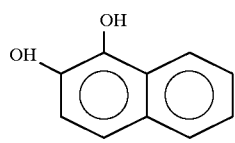 (DRR3)
Acid labile group:
tert-butoxycarbonyl group
Average substitution 50%
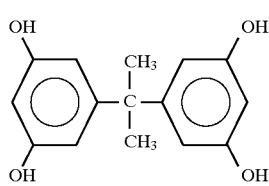 (DRR4)
Acid labile group:
tert-butoxycarbonyl group
Average substitution 75%
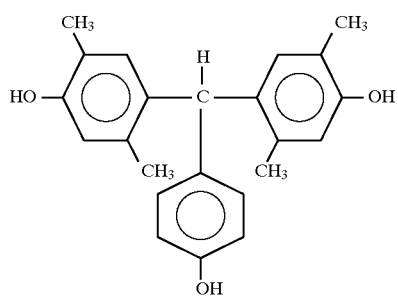 (DRR5)
Acid labile group:
tert-butyl group
Average substitution 33%
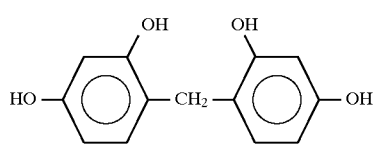 (DRR6)
Acid labile group:
tert-butoxycarbonyl group
Average substitution 50%
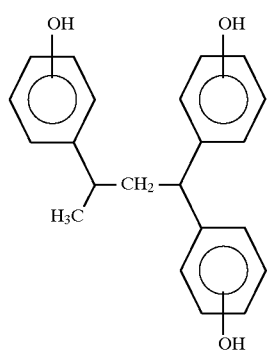 (DRR7)
Acid labile group:
tetrahydropyranyl group
Average substitution 66%

-continued

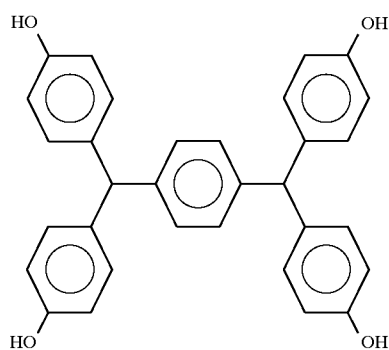

(DRR8)

Acid labile group:
tert-butoxycarbonyl group
Average substitution 50%

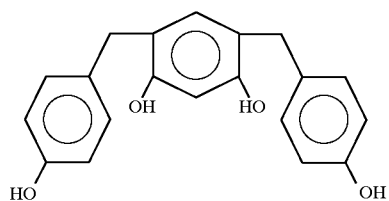

(DRR9)

Acid labile group:
ethoxyethyl group
Average substitution 50%

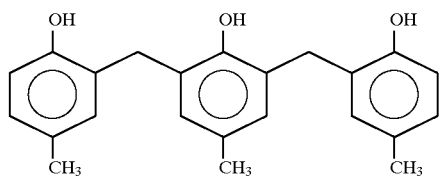

(DRR10)

Acid labile group:
tert-butoxycarbonyl group
Average substitution 33%

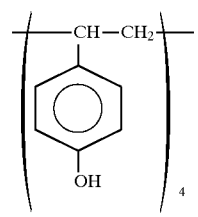

(DRR11)

Acid labile group:
tert-butoxycarbonyl group
Average substitution 50%

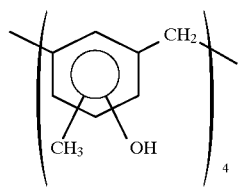

(DRR12)

Acid labile group:
tert-butoxycarbonyl group
Average substitution 50%

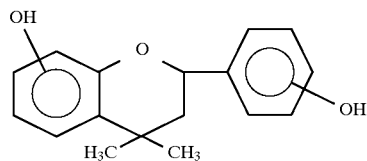

(DRR13)

Acid labile group:
tert-butoxycarbonyl group
Average substitution 50%

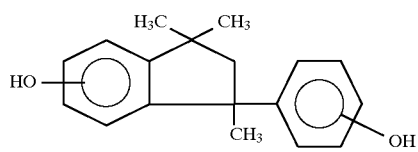

(DRR14)

Acid labile group:
tert-butoxycarbonyl group
Average substitution 50%

-continued
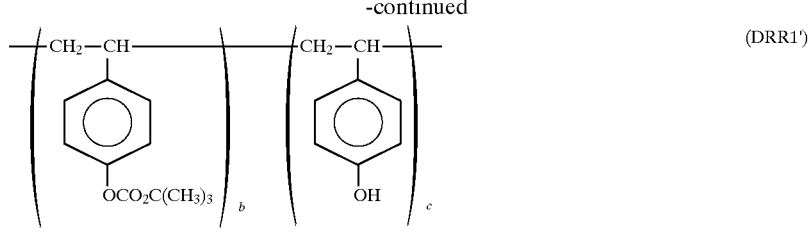
(DRR1')
b/(b + c) = 0.2
Mw = 2,500
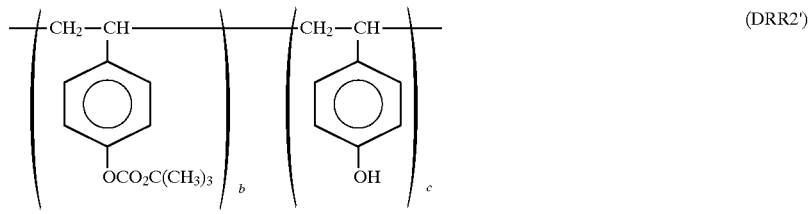
(DRR2')
b/(b + c) = 0.05
Mw = 3,000
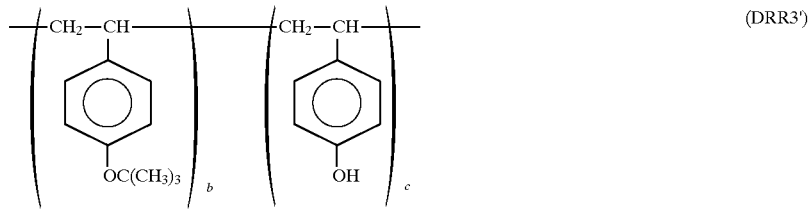
(DRR3')
b/(b + c) = 0.02
Mw = 2,500
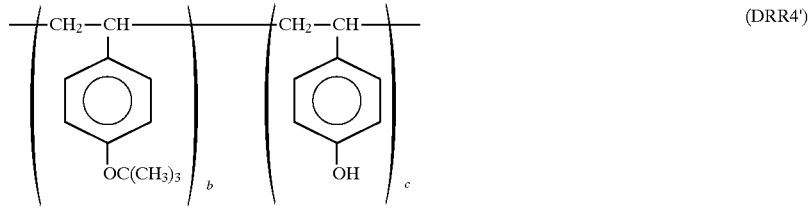
(DRR4')
b/(b + c) = 0.05
Mw = 3,000
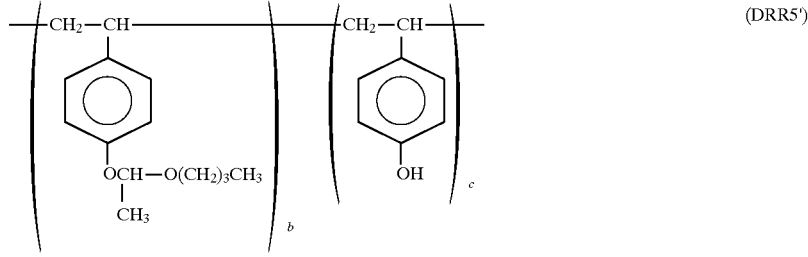
(DRR5')
b/(b + c) = 0.3
Mw = 8,000

-continued

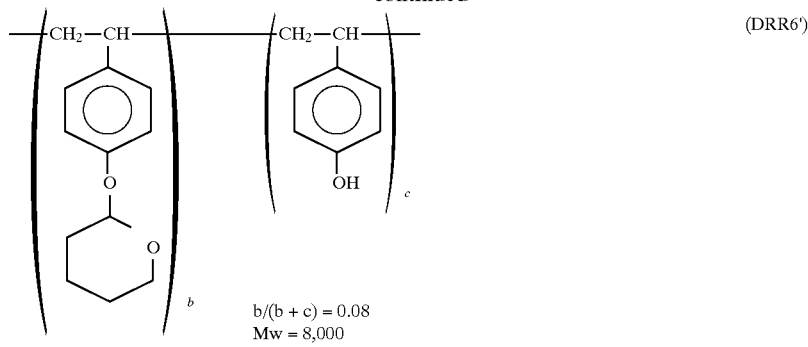
(DRR6')

b/(b + c) = 0.08
Mw = 8,000

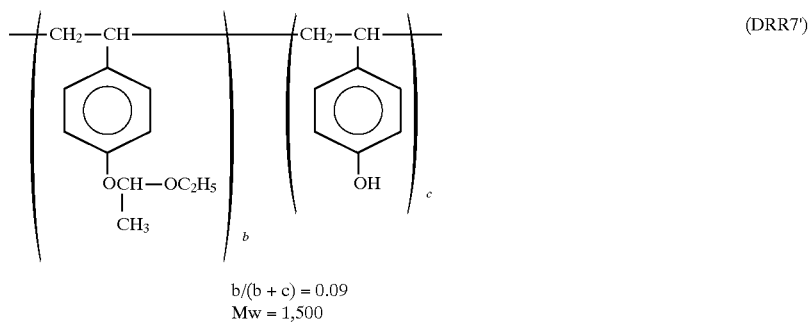
(DRR7')

b/(b + c) = 0.09
Mw = 1,500

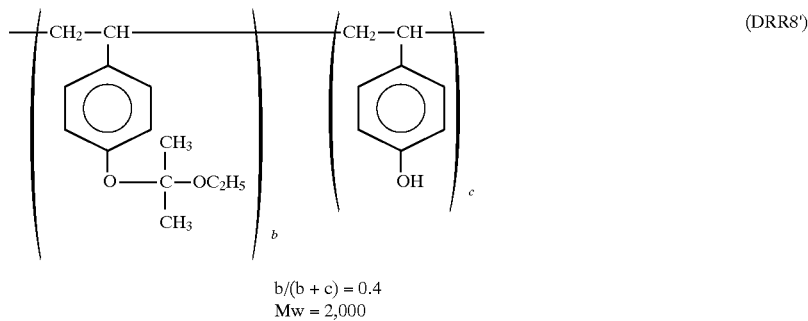
(DRR8')

b/(b + c) = 0.4
Mw = 2,000

TABLE 2

| Example | Resist composition (pbw in parentheses) | | | | | Eop (mJ/cm²) | Resolution (μm) | Edge roughness (mm) |
| --- | --- | --- | --- | --- | --- | --- | --- | --- |
| | Base resin | Photoacid generator | Dissolution regulator | Basic compound | Solvent | | | |
| 1 | Polym1 (80) | PAG1 (3) | — | — | DGLM (300) | 10 | 0.28 | 13 |
| 2 | Polym2 (80) | PAG2 (3) | — | — | DGLM (300) | 28 | 0.30 | 15 |
| 3 | Polym3 (80) | PAG3 (4) | — | — | DGLM (300) | 24 | 0.28 | 16 |
| 4 | Polym4 (80) | PAG4 (3) | — | — | DGLM (300) | 30 | 0.30 | 15 |
| 5 | Polym5 (80) | PAG5 (4) | — | — | DGLM (300) | 18 | 0.28 | 15 |
| 6 | Polym6 (80) | PAG1 (4) | DRR2 (14) | — | DGLM (300) | 9 | 0.28 | 13 |
| 7 | Polym7 (80) | PAG2 (3) | DRR1 (14) | — | DGLM (300) | 30 | 0.28 | 12 |
| 8 | Polym8 (80) | PAG2 (4) | DDR1 (14) | — | EIPA (300) | 8 | 0.28 | 11 |
| 9 | Polym9 (80) | PAG2 (3) | DRR2 (14) | — | DGLM (300) | 15 | 0.28 | 13 |
| 10 | Polym10 (80) | PAG1 (4) | DRR2 (14) | — | DGLM (300) | 25 | 0.26 | 12 |
| 11 | Polym11 (80) | PAG6 (3) | — | — | MAK (300) | 23 | 0.28 | 12 |
| 12 | Polym12 (80) | PAG7 (3) | DRR1 (14) | — | DGLM (300) | 19 | 0.24 | 15 |
| 13 | Polym13 (80) | PAG8 (3) | DRR1 (14) | — | DGLM (300) | 10 | 0.22 | 11 |
| 14 | Polym14 (80) | PAG9 (3) | DRR2 (14) | — | DGLM (300) | 30 | 0.22 | 12 |
| 15 | Polym15 (80) | PAG10 (3) | DRR2 (14) | — | DGLM (300) | 25 | 0.22 | 11 |
| 16 | Polym16 (80) | PAG1 (3) | — | — | PGMEA (300) | 15 | 0.22 | 10 |
| 17 | Polym17 (80) | PAG4 (3) | DRR1' (4) | — | PGMEA (300) | 10 | 0.22 | 12 |
| 18 | Polym18 (80) | PAG3 (3) | — | — | PGMEA (300) | 13 | 0.22 | 12 |
| 19 | Polym19 (80) | PAG1 (3) | DRR5' (4) | — | PGMEA (300) | 20 | 0.22 | 11 |
| 20 | Polym20 (80) | PAG1 (3) | — | — | PGMEA (300) | 10 | 0.22 | 14 |
| 21 | Polym21 (80) | PAG4 (3) | DRR&' (4) | — | PGMEA (300) | 14 | 0.22 | 10 |
| 22 | Polym22 (80) | PAG1 (3) | — | — | PGMEA (300) | 10 | 0.22 | 12 |

TABLE 2-continued

| | | Resist composition (pbw in parentheses) | | | | EOP | Resolution | Edge roughness |
|---|---|---|---|---|---|---|---|---|
| Example | Base Resin | Photoacid generator | Dissolution regulator | | Basic compound | Solvent | (mJ/cm$^2$) | (μm) | (mm) |
| 23 | Polym16 (80) | PAG1 (4) | DRR1 (4) | — | — | PGMEA (300) | 13 | 0.24 | 13 |
| 24 | Polym16 (80) | PAG2 (4) | DRR1 (16) | DDR2' (4) | — | PGMEA (300) | 20 | 0.24 | 10 |
| 25 | Polym16 (80) | PAG4 (4) | DRR3 (4) | — | — | PGMEA (300) | 15 | 0.24 | 13 |
| 26 | Polym14 (80) | PAG1 (4) | DRR4 (4) | — | — | PGMEA (300) | 10 | 0.22 | 13 |
| 27 | Polym14 (80) | PAG2 (4) | DRR5 (4) | — | — | PGMEA (300) | 5 | 0.22 | 13 |
| 28 | Polym14 (80) | PAG3 (4) | DRR6 (4) | — | — | DGLM (300) | 15 | 0.22 | 13 |
| 29 | Polym15 (80) | PAG1 (4) | DRR2 (16) | DRR7' (4) | — | EL/BA (300) | 20 | 0.22 | 10 |
| 30 | Polym19 (80) | PAG2 (4) | DRR3 (16) | DRR8' (4) | — | PGMEA (300) | 15 | 0.22 | 10 |
| 31 | Polym19 (80) | PAG3 (4) | DRR4 (16) | DRR1' (4) | — | DGLM (300) | 20 | 0.22 | 11 |
| 32 | Polym16 (80) | PAG1 (4) | DRR5 (16) | DRR2' (4) | — | DGLM (300) | 10 | 0.22 | 10 |
| 33 | Polym18 (80) | PAG3 (4) | DRR11 (16) | DRR3' (4) | — | DGLM (300) | 20 | 0.22 | 10 |
| 34 | Polym20 (80) | APG1 (4) | DRR6 (16) | DRR4' (4) | — | DGLM (300) | 10 | 0.22 | 10 |
| 35 | Polym16 (80) | PAG1 (4) | DRR7 (16) | DRR5' (4) | — | DGLM (300) | 8 | 0.22 | 10 |
| 36 | Polym20 (80 | PAG2 (4) | DRR8 (16) | DRR6' (4) | — | DGLM (300) | 15 | 0.22 | 10 |
| 37 | Polym16 (80) | PAG4 (4) | DRR9 (16) | DRR7' (4) | — | DGLM (300) | 20 | 0.22 | 9 |
| 38 | Polym16 (80) | PAG5 (4) | DRR10 (16) | DRR8' (4) | — | DGLM (300) | 30 | 0.22 | 9 |
| 39 | Polym16 (80) | PAG1 (3.5) PAG8 (0.5) | DRR12 (16) | DRR8' (4) | — | DGLM (300) | 20 | 0.22 | 10 |
| 40 | Polym19 (80) | PAG3 (4) | DRR13 (16) | DRR1' (4) | — | DGLM (300) | 15 | 0.22 | 10 |
| 41 | Polym19 (80) | PAG4 (4) | DRR14 (16) | DRR2' (4) | — | PGMMA (300) | 20 | 0.22 | 10 |
| 42 | Polym19 (80) | PAG2 (4) | DRR1 (16) DRR12 (4) | DRR3' (4) | — | PGMMA (300) | 25 | 0.22 | 10 |
| 43 | Polym16 (80) | PAG1 (4) | DRR7 (4) | — | tetraethylenediamine (0.2) | PGMEA (300) | 25 | 0.22 | 8 |
| 44 | Polym16 (80) | PAG7 (4) | DRR2 (16) | DRR7' (4) | dimethylethylenediamine (0.2) | PGMEA (300) | 20 | 0.22 | 8 |
| 45 | Polym16 (80) | PAG1 (3.5) PAG8 (0.5) | DRR12 (16) | DRR8' (4) | tetramethyl-ethylenediamine (0.2) | PGMEA (300) | 25 | 0.22 | 8 |
| 46 | Polym16 (80) | PAG1 (4) | DRR4 (16) | DRR8' (4) | methylethylpropylamine (0.2) | PGMEA (300) | 30 | 0.22 | 6 |
| 47 | Polym16 (80) | PAG1 (4) | DRR2 (16) | DRR7' (4) | aniline (0.2) | PGMEA (300) | 20 | 0.22 | 8 |
| 48 | Polym16 (80) | PAG1 (4) | DRR13 (16) | DRR7' (4) | piperidine (0.2) | PGMEA (300) | 15 | 0.22 | 8 |
| 49 | Polym16 (80) | PAG1 (4) | DRR2 (16) | DRR3' (4) | N-methylpyrrolidone (0.2) | PGMEA (300) | 20 | 0.22 | 8 |
| 50 | Polym22 (80) | PAG1 (4) | DRR1 (16) | DRR3' (4) | purine (0.2) | PGMEA (300) | 15 | 0.22 | 8 |
| 51 | Polym19 (80) | PAG1 (4) | DRR2 (16) | DRR7' (4) | alanhine (0.2 | PGMEA (300) | 20 | 0.22 | 6 |
| 52 | Polym19 (80) | PAG1 (4) | DRR9 (16) | DRR7' (4) | pyridinesulfonic acid (0.2) | PGMEA (300) | 20 | 0.22 | 6 |
| 53 | Polym21 (80) | PAG4 (4) | DRR9 (16) | DRR7'" (4) | 2-hydroxypyridine (0.2) | PGMEA (300) | 15 | 0.20 | 6 |
| 54 | Polym21 (80) | PAG1 (4) | DRR2 (16) | DRR1' (4) | 2-amino-p-cresol (0.2) | PGMEA (300) | 20 | 0.22 | 6 |
| 55 | Polym16 (80) | PAG1 (4) | DRR1 (4) | — | triethanolamine (0.2) | PGMEA (300) | 10 | 0.20 | 6 |
| 56 | Polym16 (80) | PAG1 (4) | DRR2 (16) | DRR8 (4) | N,N-dimethylacetamide (0.2) | PGMEA (300) | 15 | 0.22 | 6 |

TABLE 3

| | Resist composition (pbw in parentheses) | | | | | |
|---|---|---|---|---|---|---|
| Comparative Example | Base resin | Photoacid generator | Dissolution regulator | Solvent | Eop (mJ/cm$^2$) | Resolution (μm) |
| 1 | Polym23 (80) | PAG1 (3) | DRR1 (14) | DGLM (300) | 25 | 0.45 |
| 2 | Polym23 (80) | PAG2 (3) | DRR1 (14) | DGLM (300) | 45 | 0.50 |

It is evident that chemically amplified positive resist compositions within the scope of the invention have high sensitivity and high resolution and afford patterned resist films which have a well-defined profile, improved size control, plasma etching resistance, and heat resistance.

Japanese Patent Application No. 7-111189/1995 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A polymer comprising a recurring unit of at least one type of the following general formula (1) and having a weight average molecular weight of 3,000 to 300,000:

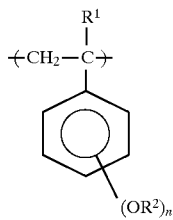

(1)

wherein $R^1$ is a hydrogen atom or methyl group, $R^2$ is a hydrogen atom or acid labile group, at least one $R^2$ being a hydrogen atom and at least one $R^2$ being an acid labile group, and letter n is equal to 2 or 3.

2. A polymer of the following general formula (2) and having a weight average molecular weight of 3,000 to 300,000:

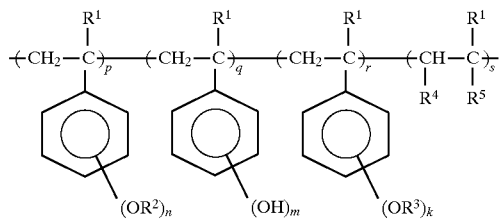

(2)

wherein $R^1$ is independently a hydrogen atom or methyl group, $R^2$ is a hydrogen atom or acid labile group, at least one $R^2$ being a hydrogen atom and at least one $R^2$ being an acid labile group, $R^3$ is an acid labile group, $R^4$ is a hydrogen atom, $R^5$ is a group represented by

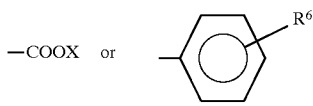

wherein X is a hydrogen atom or acid labile group and $R^6$ is a hydrogen atom or an alkyl group of 1 to 6 carbon atoms, or $R^4$ and $R^5$, taken together, may form —C(O)—O—C(O)—, each of the units may be of one or more types, letter n is equal to 2 or 3, each of m and k is equal to 1, 2 or 3, p and q are positive numbers and r and s are 0 or positive numbers satisfying $0<(p+q)/(p+q+r+s) \leq 1$ and the sum of p+q+r+s is a sufficient number to give the weight average molecular weight.

3. A polymer of the following general formula (3) and having a weight average molecular weight of 3,000 to 300,000:

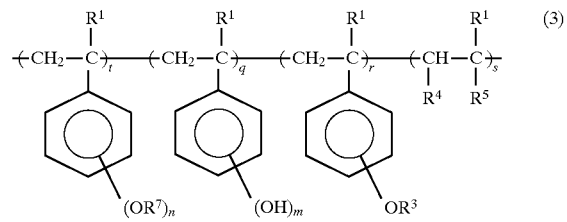

(3)

wherein $R^1$, $R^3$, $R^4$, and $R^5$ are as defined in claim 2, $R^7$ is an acid labile group, each of the units may be of one or more types, letters n and m are as defined in claim 2, t and q are positive numbers and r and s are 0 or positive numbers satisfying $0<(t+q)/(t+q+r+s) \leq 0.7$ and the sum of t+q+r+s is a sufficient number to give the weight average molecular weight.

4. The polymer of any claim 1 which is a mono-disperse polymer having a molecular weight dispersity of 1.0 to 1.5.

5. The polymer of claim 1, wherein the acid labile groups are a normal, branched or cyclic alkyl group of 1 to 6 carbon atoms, tetrahydropyranyl, tetrafuranyl, a trialkylsilyl group or a group of formula (16) or (17):

(16)

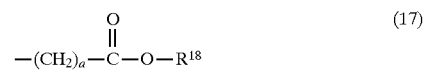

(17)

wherein $R^{15}$ and $R^{16}$ are independently a hydrogen atom or a normal or branched alkyl group of 1 to 6 carbon atoms, $R^{17}$ is a normal, branched or cyclic alkyl group of 1 to 10 carbon atoms, $R^{18}$ is a hydrogen atom or a normal, branched or cyclic alkyl group of 1 to 6 carbon atoms, and letter a is equal to 0 or 1.

6. The polymer of claim 2, wherein the acid labile groups are a normal, branched or cyclic alkyl group of 1 to 6 carbon atoms, tetrahydropyranyl, tetrafuranyl, a trialkylsilyl group or a group of formula (16) or (17):

(16)

(17)

wherein $R^{15}$ and $R^{16}$ are independently a hydrogen atom or a normal or branched alkyl group of 1 to 6 carbon atoms, $R^{17}$ is a normal, branched or cyclic alkyl group of 1 to 10 carbon atoms, $R^{18}$ is a hydrogen atom or a normal, branched or cyclic alkyl group of 1 to 6 carbon atoms, and letter a is equal to 0 or 1.

7. The polymer of claim 3, wherein the acid labile groups are a normal, branched or cyclic alkyl group of 1 to 6 carbon atoms, tetrahydropyranyl, tetrafuranyl, a trialkylsilyl group or a group of formula (16) or (17):

(16)

-continued
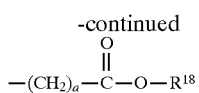
(17)
wherein $R^{15}$ and $R^{16}$ are independently a hydrogen atom or a normal or branched alkyl group of 1 to 6 carbon atoms, $R^{17}$ is a normal, branched or cyclic alkyl group of 1 to 10 carbon atoms, $R^{18}$ is a hydrogen atom or a normal, branched or cyclic alkyl group of 1 to 6 carbon atoms, and letter a is equal to 0 or 1.
* * * * *